(12) United States Patent
Stupar et al.

(10) Patent No.: US 11,186,728 B2
(45) Date of Patent: *Nov. 30, 2021

(54) ARTICLES HAVING THERMOSET COATINGS AND COATING METHODS

(71) Applicant: Nylok LLC, Macomb, MI (US)

(72) Inventors: Jeffrey M. Stupar, West Dundee, IL (US); Franco A. Cisternino, Deerfield, IL (US); Eugene D. Sessa, Harrison Township, MI (US); Robin F. Monahan, Richmond, MI (US)

(73) Assignee: Nylok LLC, Macomb, MI (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/673,375

(22) Filed: Nov. 4, 2019

(65) Prior Publication Data

US 2020/0062971 A1 Feb. 27, 2020

Related U.S. Application Data

(63) Continuation of application No. 15/654,145, filed on Jul. 19, 2017, now Pat. No. 10,465,077, which is a (Continued)

(51) Int. Cl.
*F16B 33/00* (2006.01)
*C09D 5/08* (2006.01)
(Continued)

(52) U.S. Cl.
CPC ............... *C09D 5/08* (2013.01); *B05D 1/12* (2013.01); *C09D 163/00* (2013.01); *C23F 11/12* (2013.01);
(Continued)

(58) Field of Classification Search
CPC ........ F16B 33/00; F16B 33/008; F16B 33/06; F16B 35/04; B05D 1/12; C23F 11/12
(Continued)

(56) References Cited

U.S. PATENT DOCUMENTS

| 2,122,915 A | 7/1938 | Olson |
| 3,485,132 A | 12/1969 | Hanny |

(Continued)

FOREIGN PATENT DOCUMENTS

| CN | 102510957 A | 6/2012 |
| GB | 2253163 A | 9/1992 |

(Continued)

OTHER PUBLICATIONS

3M Scotchkote Fusion Bonded Epoxy Coating 426, Product Description, Dec. 31, 2010, p. 1-4, 3M Corrosion Protection Products, Austin, TX, USA.
(Continued)

*Primary Examiner* — Roberta S Delisle
(74) *Attorney, Agent, or Firm* — Levenfeld Pearlstein, LLC

(57) ABSTRACT

A method to prevent corrosion of a susceptible article of a two-article system, in which first and second articles of the two-article system have surfaces facing one another and in which the two articles have different anodic indices includes applying a coating material to the surface of the first article and curing the coating material on the surface of the first article. The method further includes contacting and securing the surface of the first article with the surface of the second article. The two articles exhibit substantially no corrosion following exposure to a corrosive environment under standard GMW17026 for a 15 year simulated test.

20 Claims, 19 Drawing Sheets

Related U.S. Application Data continuation of application No. 15/013,294, filed on Feb. 2, 2016, now Pat. No. 9,738,792.

(60) Provisional application No. 62/257,015, filed on Nov. 18, 2015, provisional application No. 62/111,495, filed on Feb. 3, 2015.

(51) Int. Cl.
*C09D 163/00* (2006.01)
*F16B 33/06* (2006.01)
*B05D 1/12* (2006.01)
*C23F 11/12* (2006.01)

(52) U.S. Cl.
CPC ............ *F16B 33/00* (2013.01); *F16B 33/008* (2013.01); *F16B 33/06* (2013.01)

(58) Field of Classification Search
USPC .......................................... 411/378, 424, 914
See application file for complete search history.

(56) References Cited

U.S. PATENT DOCUMENTS

| | | | |
|---|---|---|---|
| 4,212,685 A * | 7/1980 | Tuttle | C23C 22/66 148/244 |
| 4,440,582 A * | 4/1984 | Smith | C10M 155/02 428/447 |
| 5,382,318 A | 1/1995 | Tahara | |
| 5,494,754 A | 2/1996 | Schubert | |
| 6,156,392 A | 12/2000 | Duffy et al. | |
| 6,338,600 B2 | 1/2002 | Friederich | |
| 6,402,447 B1 | 6/2002 | Babak | |
| 6,613,452 B2 | 9/2003 | Weir | |
| 6,846,142 B2 | 1/2005 | Gens | |
| 6,979,161 B2 | 12/2005 | Ando | |
| 7,976,258 B2 | 7/2011 | Asai | |
| 8,927,064 B2 | 1/2015 | Mori | |
| 9,738,792 B2 * | 8/2017 | Stupar | B05D 1/12 |
| 10,465,077 B2 * | 11/2019 | Stupar | F16B 33/00 |
| 2004/0206635 A1 | 10/2004 | Matsumura et al. | |
| 2004/0208726 A1 | 10/2004 | Bohme | |
| 2009/0264210 A1 * | 10/2009 | Huang | F16B 33/00 470/9 |
| 2010/0034615 A1 | 2/2010 | Mori | |
| 2011/0049834 A1 | 3/2011 | Natu | |

FOREIGN PATENT DOCUMENTS

| | | |
|---|---|---|
| JP | 2007198544 A | 8/2007 |
| KR | 20140067547 A | 6/2014 |
| TW | 201107623 A | 3/2011 |
| WO | 8900087 A1 | 1/1989 |
| WO | 2004104430 A1 | 12/2004 |
| WO | 2005092517 A1 | 10/2005 |

OTHER PUBLICATIONS

3M Scotchkote Fusion bonded Epoxy Coating 413, Product Description, Dec. 31, 2013, p. 1-2, 3M Infrastructure protection Division, Austin, TX, USA.

* cited by examiner

ARTICLES HAVING THERMOSET COATINGS AND COATING METHODS

CROSS-REFERENCE TO RELATED APPLICATION DATA

This application is a continuation of U.S. patent application Ser. No. 15/654,145, filed Jul. 19, 2017, which is a continuation of U.S. patent application Ser. No. 15/013,294, filed Feb. 2, 2016, now U.S. Pat. No. 9,738,792, which claims the benefit of and priority to Provisional Patent Application Ser. No. 62/257,015, filed Nov. 18, 2015 and Provisional Patent Application Ser. No. 62/111,495, filed Feb. 3, 2015, the disclosures of which are incorporated herein in their entireties.

BACKGROUND

Certain aspects of this disclosure relate to articles and/or assemblies having coated components or features, and processes for coating such articles. In particular, certain aspects of the disclosure relate to a metal article at least partially covered with one or more thermoset coatings and/or an inorganic coating capable of preventing galvanic corrosion from occurring when the article is in contact with a dissimilar metal or other material in the presence of an electrolyte, assemblies having such an article, and processes for producing such articles.

There are many different types of corrosion. In general, corrosion is the conversion of a material, for example, a metal, to a more stable form. There are, however, two major types of corrosion: general or uniform attack corrosion; and galvanic corrosion. General or uniform attack corrosion can occur, for example, when iron is in a wet or damp environment and it corrodes, forming iron oxide in the process.

Galvanic corrosion, on the other hand, occurs when two materials having different anodic indices or electro-potentials are in contact with, or close proximity to, one another in the presence of an electrolyte. The electro-potential difference produces electron flow between the materials. In such a system, one of the materials is more active (or less noble) and serves as an anode and the other material is less active (or more noble) and serves as a cathode. The anode corrodes at an accelerated rate, while the cathode corrodes at a lesser rate.

An example of a system in which galvanic corrosion can occur is a steel bolt securing a magnesium panel to an object in the presence of non-distilled water, such as a salt spray environment. The magnesium, being less noble than the steel, will corrode at an accelerated rate, while the steel will corrode at a slower rate. This problem is not limited to dissimilar metals, in that galvanic corrosion can occur when, for example, a steel bolt is used to secure a non-metal panel, such as a carbon fiber panel. In this system, the steel being less noble than the carbon fiber will corrode at an accelerated rate, while the carbon fiber panel will corrode at a slower rate. Again, when two materials having different anodic indices are in contact with or close proximity to one another, the potential for galvanic corrosion is present with the less noble material exhibiting accelerated corrosion.

Once an electrolyte is present, for example by the presence of non-distilled water, such as salt spray and the like, corrosion can occur, which can weaken the structural integrity of whatever material is acting as the anode by virtue of its relative electro-potential and/or result in an undesirable aesthetic appearance. Galvanic corrosion is a problem in the automotive and aerospace fields, amongst others.

In, for example, the automotive industry, there is a strong desire to reduce the weight of vehicles. Such light-weighting, is driven by the effort to increase fuel efficiency. As such, lighter weight materials, such as aluminum, magnesium and carbon fiber, are used in body and drive train components. However, in many instances, the use of light-weight components cannot be carried over to fasteners, such as bolts and the like. Thus, the bolts used are typically iron alloy materials, such as steel. The reluctance to use these light-weight materials in fasteners is due to their increased cost and the acceptance of steel fasteners, their strength and overall mechanical properties.

To prevent galvanic corrosion, similar materials or different materials with similar electro-potentials (anodic indices) can be used. However, this limits the types of combinations of materials available for the desired application.

In another scenario, a barrier can be imposed between the dissimilar materials. For example, a bolt coated with a polymeric material such as nylon or a polymeric seal can be disposed between the head of a bolt and the panel. However, nylon coatings or seals may not discourage galvanic corrosion, and may not meet the general mechanical requirements of the system. For example, the coating may be too thick and interfere with the engagement of the bolt with a female member (e.g., a nut), or increase the coefficient of friction when driving the bolt, or the resiliency of the coating or seal may result in the loss of tension when subject to temperature changes, e.g., heat up and cool down, of the system. In addition, such polymeric coatings or seals may not provide the barrier needed to prevent electron transfer between the dissimilar materials. Furthermore, resilient polymeric material may not maintain structural integrity with temperature fluctuations, vibrations and other forces to which the system may be subjected.

Accordingly, there is a need for a method for preventing galvanic corrosion in systems that have dissimilar materials in contact with or in close proximity to one another in the presence of an electrolyte. Desirably, such a method uses materials that withstand heat up and cool down cycles of the system while maintaining protection of the materials from galvanic corrosion. More desirably still, such a method uses materials that maintain the mechanical properties and requirements of the system. Still more desirably, such a method can be carried out in a manufacturing environment, in a cost effective manner.

There is also a need for a multi-part article system that exhibits resistance to galvanic corrosion under a variety of adverse environmental conditions, while maintaining the required mechanical properties, conditions, characteristics and specifications of the system.

SUMMARY

In accordance with one exemplary aspect, an article of a first material, such as a metal article comprising at least a first surface is disclosed, the first surface being at least partially covered by a thermoset coating. In some examples the article is entirely covered by the thermoset coating. In various examples, the thermoset coating is a rapid-cure thermoset coating. In certain embodiments, the rapid-cure thermoset coating material cures in about one minute or less when the coating material in contact with the metal article and is exposed to an induction heater. In other examples the coating material cures in approximately thirty seconds or less. In some embodiments, the coating cures in either of the above time periods (or others) when exposed to temperatures between about 350 degrees to 475 degrees Fahrenheit.

In certain examples, the thermoset coating is a cross-linked epoxy coating, and may be a fusion-bond epoxy coating.

In some embodiments, the thermoset coating is made from a powder, such as an epoxy powder, that is subsequently cured to form the thermoset coating. In various examples, the coating is made from a powder comprising an epoxy resin and one or more curing agents or hardeners. The curing agents or hardeners may consist of or comprise one or more amines, anhydrides, acids, phenols and/or alcohols. In certain examples, the thermoset coating is made from a fusion bonded epoxy coating, such as 3M® Fusion Bonded Epoxy 413, 3M® Scotchkote 426 FAST and/or Axalta Alesta 74550. In some examples, the coating material cures in approximately thirty seconds or less when subjected to a temperature of about 400 to 450 degrees Fahrenheit, while in others about 420 to 430 degrees Fahrenheit, while in still others about 425 degrees Fahrenheit, after being applied as a powder to the article.

In various embodiments, the article further comprises a lubricant coating in contact with at least a portion of the article. In some examples, the lubricant coating covers or is in contact with at least a portion of the thermoset coating, while in others it covers the entire article and/or the entire surface of the thermoset coating. In some embodiments, the lubricant coating consists of or comprises one or more waxes, for example a polyethylene wax, molybdenum disulfide, or one or more fluoropolymers.

In some examples, the thermoset coating has a substantially uniform thickness. In various embodiments, the coating thickness (regardless of the geometry and/or shape of the article) only deviates from about 0.002 inches or less from the overall average coating thickness, while in others about 0.001 inches or less, and in still others about 0.0005 inches or less. In certain embodiments, the thermoset coating thickness is about 0.005 inches or less, while in others it is approximately 0.0035 inches or less, or approximately 0.0025 inches or less, or approximately 0.0015 inches or less, or approximately 0.0010 includes or less, or approximately 0.0005 inches or less. In various embodiments, the thickness is between approximately 0.0005 to 0.005 inches, approximately 0.0015 to 0.0035 inches, and approximately 0.0025 inches.

In certain examples, the article comprises an inorganic coating, including but not limited to a ceramic coating. In some examples the article is electroplated and/or plasma-treated, for example the article may comprise a Keronite® coating. These examples may also comprise one or more of the thermoset coatings described herein and/or one or more lubricant coatings on top of the inorganic, e.g. ceramic, coating (i.e., article→ceramic coating→thermoset coating→lubricant→).

In certain examples, the thermoset coated article has a heat resistance such that it may be exposed to elevated temperatures for extended time periods without adverse effects to the coating. For example, in certain embodiments the coated article is capable of withstanding approximately 350 degrees Fahrenheit for approximately thirty minutes without adverse effects to the coating, such as softening, melting, flowing, dripping, charring and the like.

In some embodiments, the article is a fastener, for example a fastener, bolt, clip or shank. The article may consist of or comprises any metal or metallic alloy. In certain embodiments, the article is iron or an iron alloy, such as steel. In others, such as the articles that also comprise a ceramic coating, the article is magnesium, aluminum, titanium, or alloys thereof.

In certain examples, the thermoset coating comprises a first thermoset coating, and a second thermoset coating is applied to the article on top of the first thermoset coating, a portion thereof, or the entire surface of the article, including any or all portions already covered by the first thermoset coating. In various examples, the first thermoset coating is a rapid-cure thermoset coating and the second thermoset coating is not a rapid-cure thermoset coating. For example, in some embodiments the first thermoset coating cures in about one minute or less when exposed to an induction heater while in contact with the metal article, while the second thermoset coating requires a longer cure time at an equivalent temperature range used for curing the first thermoset coating, for example ten minutes or more, or fifteen minutes or more.

In some examples, the second thermoset coating comprises one or more epoxies, polyesters or polyurethanes, while in others the second coating comprises an epoxy/polyester mixture. In one example, the second thermoset coating is made from a Valspar® TGIC polyester (such as PRA60001). In various examples, the second thermoset coating is only-partially cross-linked, for example when it is exposed to heat for a period of time shorter than necessary to achieve full curing. These examples comprising a second thermoset coating may also comprise the lubricant coating, for example, where the lubricant coating covers at least a portion of the top surface of the second thermoset coating. (i.e., article→first thermoset coating→second thermoset coating→lubricant).

In accordance with another aspect, an assembly is disclosed, the assembly comprising a first article and a second article configured to be fastened or connected to the first article, wherein the two articles have dissimilar electropotentials such that galvanic corrosion may occur when the articles are in the presence of an electrolyte. The first article may be partially or entirely coated with one or more thermoset coatings, such as any of the coatings described above or elsewhere in this disclosure, and optionally may be coated with a lubricant coating partially or entirely on the top surface of a thermoset coating. In certain examples, the second article comprises, is connected to, or is configured to be connected to a third article. In various embodiments, the second article is also partially or entirely covered with one or more thermoset coatings, and optionally may be coated with a lubricant coating partially or entirely on the top surface of a thermoset coating. In certain examples, the second article may also comprise a non-thermoset coating, such as a thermoplastic coating.

In accordance with another aspect a process is disclosed. In some examples, the process comprises applying a powder coating to an article (for example by spraying the powder coating onto the article optionally after the powder coating and/or article has been subjected to a process that creates a charge on the surface of the powder coating and/or article such as a tribo charge). The process may also comprise transporting the powdered article to a heat source, such as an induction heater. In certain examples, a metal article is at room temperature or ambient temperature, the powder is applied to the metal article optionally after the powder coating and/or article has been subjected to a process that creates a charge on the surface of the powder coating and/or article such as a tribo charge, and then the article and powder are heated, for example by exposure to an induction heater, such that the powder cures into a cross-linked thermoset coating. The process may further comprise transporting the coated article to a lubricating station, where one or more lubricants (e.g. a polyethylene wax emulsion) are applied to the article, for example through spraying.

The process may also comprise drying the lubricated article, for example through another application of induction heating. In some examples, prior to lubrication another thermoset coating material is applied and at least partially cured on the article. In certain examples, the process may comprise forming a ceramic coating on the article, and then applying one or more thermoset coatings (for example, a rapid-cure then a non-rapid cure thermoset coating) and then optionally applying one or more lubricant coatings.

Also disclosed are methods to inhibit and/or prevent corrosion, such as galvanic corrosion of a susceptible article of a two-article system, in which first and second articles of the two-article system have surfaces facing one another and in which the two articles are comprised of materials having different anodic indices, the method including applying a coating material to the surface of the first article, curing the coating material on the surface of the first article and contacting and securing the surface of the first article with the surface of the second article, such that the two articles exhibit substantially no galvanic corrosion following exposure to a corrosive environment under standard General Motors Worldwide Engineering Standards test procedure GMW17026, "Accelerated Corrosion Laboratory Test for Galvanic Corrosion Mechanisms" for a 15 year simulated exposure test. In an embodiment of the method, when the cured coating material is present on at least a head of a steel bolt mounted to a magnesium coupon, the magnesium coupon exhibits less than about 20%, 10%, 5%, 3%, or 1% of pitting as compared to an uncoated steel bolt mounted on the magnesium coupon corrosion following exposure to a corrosive environment under standard GMW17026 for a 15 year simulated test.

In an embodiment of the method to inhibit and/or prevent corrosion such as galvanic corrosion, the coating material is a thermoset material. The thermoset material can be an epoxy material that cross links during curing to form a cross-linked epoxy coating. One such epoxy material is a fusion bond epoxy material. The epoxy material can further comprise a curing agent or hardener, such as one or more of more amines, anhydrides, acids, phenols, alcohols and thiols. The epoxy material can further comprise one or more of a filler and a pigment. In a method, the epoxy material cures in approximately thirty seconds or less when subjected to a temperature of about 400 to 450 degrees Fahrenheit to form the cross-linked epoxy coating.

The method can include applying the coating material as a powder. The powder can be sprayed onto the article, for example, after a charge has been applied to the powder and/or the article.

In one method, the coating material comprises a first coating material and a second coating material, such that the first coating material is fully cured to form a first cured layer and the second coating material is applied onto the first cured layer. The second coating material can be a thermoset material. The first coating material can be a fast curing material and the second coating material can cure at a slower rate than the first coating material.

In a method, the curing is heat curing. The heat curing can be induction heat curing and can include subjecting the article to a magnetic field after the thermoset material has been applied to at least a portion of the surface of the article.

In an embodiment of the method, the second coating material is a lubricant. The lubricant can be one or more of a polyethylene wax, a paraffin wax, a carnauba wax, and a solid lubricant. The solid lubricant can be one or more of molybdenum disulfide and a fluoropolymer.

In an embodiment of the method, the coating material, when cured, has a substantially uniform thickness of about 0.005 inches or less, while in others it is approximately 0.0035 inches or less, or approximately 0.0025 inches or less, or approximately 0.0015 inches or less, or approximately 0.0010 includes or less, or approximately 0.0005 inches or less. In various embodiments, the thickness is between approximately 0.0005 to 0.005 inches, approximately 0.0015 to 0.0035 inches, and approximately 0.0025 inches. The thickness can be about 0.0015 inches.

In the method, the first and second articles can be made of dissimilar metals. For example, the first article can be made of iron or an iron alloy and the second article can be made of magnesium or a magnesium allow, aluminum or an aluminum alloy, or titanium or a titanium alloy. One of the first and second articles can be made of a non-metal (e.g., a carbon-based material such as graphite, for example, a carbon fiber material). The first article and second article can be made of materials having different anodic indices, for example, the anodic indices differ by at least 0.1, 0.2, 0.3, 0.4, 0.5, or more.

The first article can have an anodic index that is less than the second article. The first article may comprise iron or an iron alloy and the second article may comprise magnesium or a magnesium alloy. Alternately, the second article may comprise aluminum or an aluminum alloy.

The first article can be a male-part fastener, such as a bolt or screw. In such a method, the bolt can exhibit a tension loss of no more than about 50%, 45%, 40%, 35%, 30%, 25%, 20%, 15%, 10%, or less when heated to a temperature of at least about 125° C. for a period of 800 hours, and a tension loss of no more than about 25%, 20%, 15%, 10%, 5%, or less when subjected to thermal cycle at temperatures between about −40° C. and 80° C. (about −40° F. and 176° F.), for 13 cycles and held at each temperature for a period of 3 hours.

Also disclosed is a two-article system having first and second articles having surfaces facing one another, in which the two articles have different anodic indices, and further in which the surface of the first article comprises a coating layer formed by curing a coating material on the surface of the first article, and the surface of the first article is in contact and secured with the surface of the second article. The two articles exhibit substantially no galvanic corrosion following exposure to a corrosive environment under standard GMW17026 for a 15 year simulated exposure test. In an embodiment of the system, when the cured coating material is present on at least a head of a steel bolt mounted to a magnesium coupon, the magnesium coupon exhibits less than about 20%, 10%, 5%, 3%, or 1% of pitting as compared to an uncoated steel bolt mounted on the magnesium coupon after a 15 year simulated test under test procedure GMW17026.

In an embodiment, the coating material is a thermoset material. The thermoset material can be a cross-linked epoxy coating, such as a fusion bond epoxy material. In an embodiment, the epoxy material comprises a curing agent or hardener. The curing agent or hardener can comprise one or more of more amines, anhydrides, acids, phenols, alcohols and thiols. In an embodiment, the epoxy material comprises one or more of a filler and a pigment. The epoxy material can cure in approximately thirty seconds or less when subjected to a temperature of about 400 to 450 degrees Fahrenheit to form the cross-linked epoxy coating.

In an embodiment, the coating material comprises a first coating material and a second coating material, such that the first coating material is fully cured to form a first cured layer, and the second coating material is applied onto at least a portion of the outer surface of the first cured layer to form the coating material.

The second coating material can be a thermoset material, and the first coating material can be a fast curing material, such that the second coating material cures at a slower rate than the first coating material. In an embodiment, the second coating material is a lubricant. The lubricant can be one or more of a polyethylene wax, a paraffin wax, a carnauba wax, and a solid lubricant. A solid lubricant can be one or more of molybdenum disulfide and a fluoropolymer.

In an embodiment, the coating material, when cured, has a substantially uniform thickness of about 0.0001 to 0.005 inches. The thickness of the thermoset coating can be about 0.005 inches or less, about 0.0035 inches or less, about 0.0025 inches or less, about 0.0015 inches or less, about 0.0010 includes or less, or about 0.0005 inches or less. In various embodiments, the thickness is between approximately 0.0005 to 0.005 inches, approximately 0.0015 to 0.0035 inches, and approximately 0.0025 inches.

In a system, the first and second articles are dissimilar metals. One of the first and second articles can be a non-metal. The first article can be a steel bolt and the second article is formed from a metal having a lesser anodic index. The second article can be formed from magnesium and the cured coating material can be present on at least a head of the steel bolt, such that when mounted to a magnesium coupon, the magnesium coupon exhibited less than about 20%, 10%, 5%, 3%, or 1% of pitting as compared to an uncoated steel bolt on the magnesium coupon, when the coupon with the uncoated steel bolt exhibited pinhole perforation (or through-wall perforation) following 15 year simulated exposure testing under test procedure GMW17026.

In an embodiment, the first article has an anodic index that is greater than the second article. The first article can comprise iron or an iron alloy. The second article can comprise magnesium or a magnesium alloy or aluminum or an aluminum alloy.

In a system the first article is a male-part fastener. The male-part fastener can be a bolt or screw. In such a system the screw exhibits a tension loss of no more than about 50%, 45%, 40%, 35%, 30%, 25%, 20%, 15%, or 10% when heated to a temperature of at least about 125° C. for a period of at least about 800 hours, and a tension loss of no more than about 25%, 20%, 15%, 10%, 5%, or less when subjected to thermal cycle at temperatures between about −40° C. and 80° C. (about −40° F. and 176° F.), for 13 cycles and held at each temperature for a period of 3 hours.

In an embodiment, the first article is a steel bolt and the coating layer is present on at least a head and an underside of the head of the steel bolt. Optionally, if the bolt includes a flange, the coating may be present on at least a portion of the flange. Optionally, the coating may be present on at least a portion of the threads of the bolt on the bolt shank.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

Exemplary embodiments of the disclosure will now be described by way of example only and with reference to the accompanying drawings, in which:

FIGS. 9A-9G are photographs visually illustrating the results of corrosion testing simulated at 1, 2, 3, 4, 5, and 8-9 year simulated exposure of undistressed uncoated bolts (right-hand side) and undistressed thermoset coated bolts (left-hand side) in a magnesium coupon, in a corrosive environment under standard GMW17026, in which FIG. 9A illustrates the bolts and coupon prior to testing, FIG. 9B illustrates the bolts and coupon at a simulated 1 year exposure, FIG. 9C illustrates the bolts and coupon at a simulated 2 year exposure, FIG. 9D illustrates the bolts and coupon at a simulated 3 year exposure, FIG. 9E illustrates the bolts and coupon at a simulated 4 year exposure, FIG. 9F illustrates the bolts and coupon at a simulated 5 year exposure, and FIG. 9G illustrates the bolts and coupon at a simulated 8-9 year exposure;

FIGS. 11A-11L are photographs visually illustrating the results of corrosion testing simulated at 1, 2, 3, 4, 5, 10, 11, 12, 13, 14 and 15 year exposure of a carbon fiber coupon with undistressed uncoated bolts (left-hand side) and undistressed thermoset coated bolts (right-hand side) mounted to coupons in a corrosive environment under standard GMW17026, in which FIG. 11A illustrates the bolts and coupon prior to testing, FIG. 11B illustrates the bolts and coupon at a simulated 1 year exposure, FIG. 11C illustrates the bolts and coupon at a simulated 2 year exposure, FIG. 11D illustrates the bolts and coupon at a simulated 3 year exposure, FIG. 11E illustrates the bolts and coupon at a simulated 4 year exposure, FIG. 11F illustrates the bolts and coupon at a simulated 5 year exposure, and FIG. 11G illustrates the bolts and coupon at a simulated 10 year exposure, FIG. 11H illustrates the bolts and coupon at a simulated 11 year exposure, FIG. 11I illustrates the bolts and coupon at a simulated 12 year exposure, FIG. 11J illustrates the bolts and coupon at a simulated 13 year exposure, FIG. 11K illustrates the bolts and coupon at a simulated 14 year exposure and FIG. 11L illustrates the bolts and coupon at a simulated 15 year exposure; and FIGS. 12A-12L are photographs visually illustrating the results of corrosion testing simulated at 1, 2, 3, 4, 5, 10, 11, 12, 13, 14 and 15 year exposure of a carbon fiber coupon with distressed uncoated bolts (right-hand side) and distressed thermoset coated bolts (left-hand side) mounted to coupons in a corrosive environment under standard GMW17026, in which FIG. 12A illustrates the bolts and coupon prior to testing, FIG. 12B illustrates the bolts and coupon at a simulated 1 year exposure, FIG. 12C illustrates the bolts and coupon at a simulated 2 year exposure, FIG. 12D illustrates the bolts and coupon at a simulated 3 year exposure, FIG. 12E illustrates the bolts and coupon at a simulated 4 year exposure, FIG. 12F illustrates the bolts and coupon at a simulated 5 year exposure, and FIG. 12G illustrates the bolts and coupon at a simulated 10 year exposure, FIG. 12H illustrates the bolts and coupon at a simulated 11 year exposure, FIG. 12I illustrates the bolts and coupon at a simulated 12 year exposure, FIG. 12J illustrates the bolts and coupon at a simulated 13 year exposure, FIG. 12K illustrates the bolts and coupon at a simulated 14 year exposure and FIG. 12L illustrates the bolts and coupon at a simulated 15 year exposure.

DETAILED DESCRIPTION OF EMBODIMENTS

Figure 1:
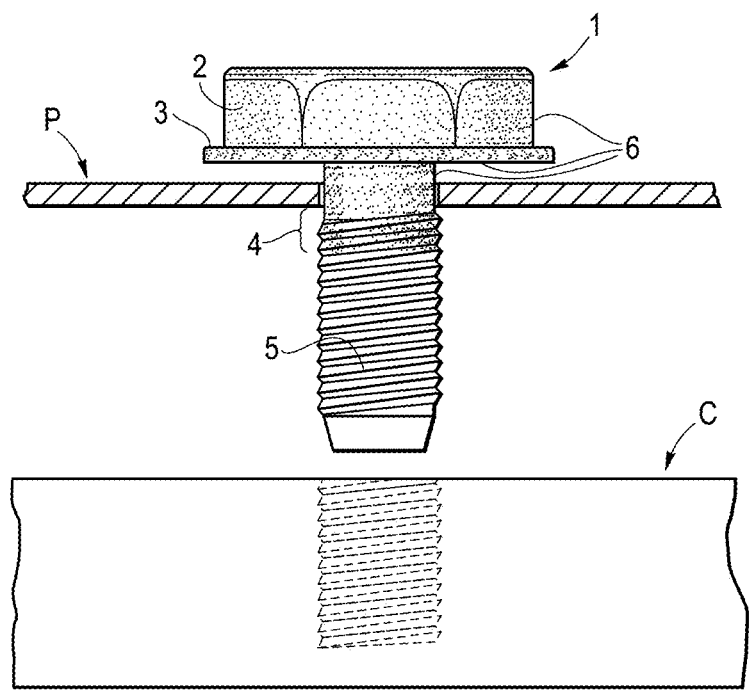
FIG. 1 is a schematic illustration of an example of a fastener having a thermoset coating thereon, the fastener shown with a panel and an underlying structure in a partially exploded view for ease of illustration.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

In the following description of various examples of articles, coatings, assemblies, and components thereof, or processes for making any of the same, in this disclosure, reference is made to the accompanying drawings, which form a part hereof, and in which are shown by way of illustration various example structures and environments in which aspects of the disclosure may be practiced. The present disclosure uses several definitions, as set forth below and throughout the application.

It is to be understood that other structures and environments may be utilized and that structural and functional modifications may be made from the specifically described structures and methods without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

Figure 8:
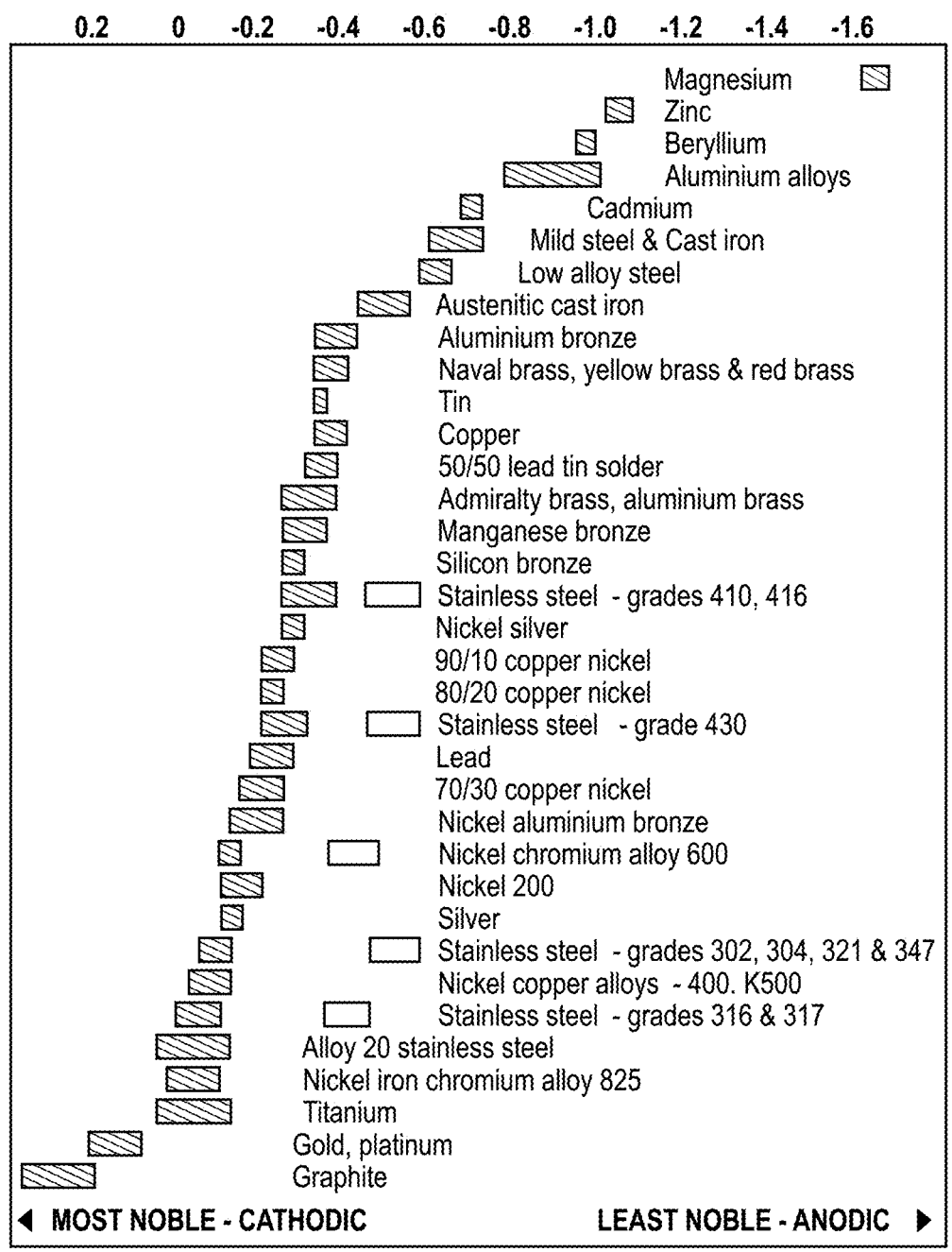
FIG. 8 is table showing the relative anodic indices of various commonly used materials, in which the least noble material are shown at the top of the table and the more noble materials are shown at the bottom of the table.

The embodiments, apparatuses and methods described herein provide, inter alia, a system in which at least two articles of dissimilar materials, such as any of the materials shown in the table of FIG. 8 are in contact with or close proximity to one another, and in which at least one of the articles is at least partially coated with a material capable of preventing galvanic corrosion from occurring. Such a system can be, for example, assemblies having two dissimilar metals in contact with one another, or a metal in contact with a non-metal, such as a carbon fiber material or the like, in the presence of an electrolyte. A method for preventing galvanic corrosion in such a system is also disclosed. In non-limiting examples, a steel component such as a steel bolt, is partially or entirely coated with a material that is capable of preventing galvanic corrosion from occurring, which bolt is used to secure a chrome article, a magnesium article, an aluminum article, a stainless steel article, or a carbon fiber article, such as a pan, panel or applique, to a structure, such as casing, or an underlying structure, without adversely affecting the mechanical properties, requirements, conditions and specifications of the system. It will be appreciated that the present method and system protect, for example, underlying components, such as magnesium oil pans when secured to a casing using steel bolts, and protect steel bolts when used to secure carbon fiber panels to an underlying structure, noting that, as seen in FIG. 8, steel is at about a mid-point of the anodic index and magnesium and carbon fiber are at extreme opposite ends of the anodic index spectrum.

These and other aspects, features and advantages of the disclosure or of certain embodiments of the disclosure will be further understood by those skilled in the art from the following description of exemplary embodiments. Amongst other advantages, the coated articles of this disclosure may be produced very quickly via a high volume manufacturing process, have a high strength/durability/scratch resistance, and may be able to withstand elevated temperatures for extended time periods. In addition, the coated articles exhibit good resistance to chemicals found in automotive applications, such as motor oil, fuels (diesel, gasoline, bio-based and compounded fuels such as ethanol based fuels), power steering fluid, windshield washer fluid and the like.

In accordance with one exemplary aspect, a metal article comprising at least a first surface is disclosed, the first surface being at least partially covered by a thermoset coating.

FIG. 1 illustrates one such example. In FIG. 1, a coated bolt 1 is used to secure a panel P, such as a transmission oil pan, to a transmission casing C. In FIG. 1, the head 2 of the bolt 1, the flange 3 of the bolt 1 and a portion 4 of the shank 5 having the thermoset coating 6 applied thereto. The bolt 1 can be formed from steel, the panel or pan P formed from magnesium and the underlying structure or the casing C formed from aluminum. It will be appreciated that the magnesium pan P is significantly more anodic than the steel of the bolt 1, and thus susceptible to galvanic corrosion. In the illustrated example, the coating 6 is present over the head 2 and flange 3 and partially 4 along the threads on the shank 5 of the bolt 1, and thus provides a barrier between the bolt 1 and the pan P to prevent and/or inhibit galvanic corrosion. It will be appreciated that the extent of the coating can be more or less, depending upon the application.

Figure 2:
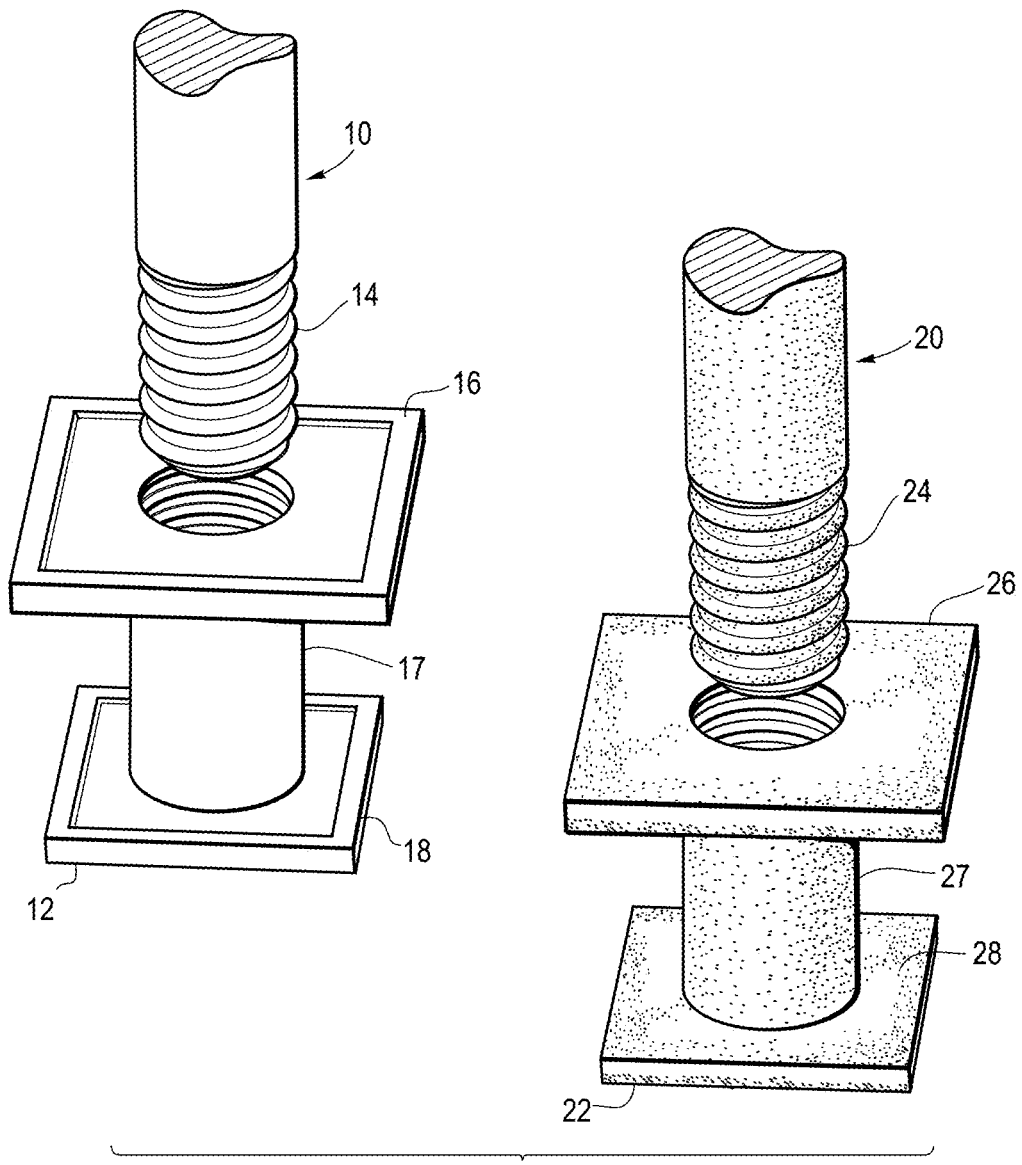
FIG. 2 illustrates two example articles of this disclosure, one without any coatings and one with a thermoset coating applied to a portion thereof.

FIG. 2 provides other illustrative examples of coated and non-coated article. In FIG. 2, non-coated article 10 (in this example, a different form of bolt) has a threaded portion 14 and a fastening assembly 12 configured to accept a second article, the fastening assembly comprising a first wear surface 16, a second wear surface (in this example, the head of the bolt) 18 and a connecting portion 17. In this example, surfaces of the fastening assembly are configured to come into contact with an article made of a dissimilar metal. FIG. 1 also shows a coated article 20, wherein a portion of the article has a thermoset coating. While in some examples the article is entirely covered by the thermoset coating while in others only a portion or portions of the article are coated. In the example of FIG. 2, the entire fastening assembly 22 of coated article 20 is covered with the thermoset coating, including the threaded portion 24, providing coated wear surfaces 26 and 28 and a coated connecting portion 27. It should, however, be noted that in some examples, the threaded portion 24 may not be coated.

As a representative example, the coated article may be connected to or incorporated in a larger assembly through or by the non-coated portion, such as threaded portion 24 here, and then another metal or non-metal component having a different galvanic or electro-potential or anodic index is connected or fastened to the fastening assembly. The fastening assembly may have any appropriate size, geometry, or configuration as needed based on the parts that are to be joined together. In many examples, the article comprises one or more recesses, hollows, channels, cavities, or other features configured to interact with or fastener to an appropriate feature on a second article, where the interior of the recess (es) etc. are coated with one or more coatings. In other examples, the coated article does not have a fastening assembly of any kind, but is rather configured to simply be in contact with a dissimilar metal or non-metal component having a different galvanic or electro-potential or anodic index such that galvanic corrosion may otherwise occur without the thermoset coating.

In the illustrative example of FIG. 2, the primary wear protection is needed at the slot defined by and between portions 26 and 28, where, for example, a chrome-plated applique component is ultimately slid into the slot between the two flat plates. In some examples, such as the coated article 20 of FIG. 2, any and all surfaces of components that act as wear surfaces are coated by the thermoset coating (or coatings, as described in more detail below), while in others only the particular wear surfaces are coated. To use the coated article 20 as an example, other embodiments may only apply coatings to the interior surfaces of the fastening assembly 22 that define or are within the slot, and ultimately come into contact with the dissimilar metal or non-metal component having a different galvanic or electro-potential or anodic index, and not the outward facing surfaces of the same components.

The articles, assemblies, systems, and methods disclosed herein include or utilize a thermoset material as a coating. As would be understood in the art, a thermoset material comprises a prepolymer which cures irreversibly after exposure to heat, generally above 392 F, chemical reaction, and/or suitable irradiation. Accordingly, the thermoset material included in or utilized by the articles, assemblies, systems, and methods disclosed herein may be cured by any suitable means including heat, chemical reaction, and/or suitable irradiation. Suitable heating methods for curing the thermoset material may include, but are not limited to, subjecting the thermoset material to heat generated by induction. Examples of suitable thermoset materials for use in the disclosed articles, assemblies, systems, and methods may include, but is not limited to, epoxy materials such as epoxy resins or polyepoxides, polyester or polyester resin material, polyurethane material, vulcanized rubber material, phenol-formaldehyde resin material such as Bakelite, melamine material, diallyl-phthalate (DAP) material, polyimide material, and cyanate ester or polycyanurate material. Optionally, the thermoset material may include a prepolymer and a hardener (e.g., a co-reactant including polyfunctional amines, acids (and acid anhydrides), phenols, alcohols and/or thiols).

In various examples, the thermoset coating is a rapid-cure thermoset coating. In certain embodiments, the rapid-cure thermoset coating material cures in about one minute or less when exposed to an induction heater while the coating material in contact with the metal article, while in others it cures in approximately thirty seconds or less. In some examples, the coating cures in either of the above time periods (or others) when exposed to temperatures between about 350 degrees to 475 degrees Fahrenheit. In some examples, the coating material cures in approximately thirty seconds or less when subjected to a temperature of about 400 to 450 degrees Fahrenheit, in others about 350 to 490 degrees Fahrenheit, while in others about 420 to 430 degrees Fahrenheit, while in still others about 425 degrees Fahrenheit, after being applied as a powder to the article.

In various examples, the thermoset coating comprises an epoxy material such as an epoxy resin material or polyepoxide material. The epoxy resin material of the thermoset coating may be reacted (cross-linked) either with itself through catalytic homopolymerization, or with a wide range of co-reactants including polyfunctional amines, acids (and acid anhydrides), phenols, alcohols and thiols. These co-reactants may be hardeners or curatives, and the cross-linking reaction may be referred to as "curing." Suitable epoxy resin materials for the thermoset coating may include, but are not limited to, bisphenol A epoxy resin material (e.g., as produced by combining epichlorohydrin and bisphenol A to give bisphenol A diglycidyl ethers), bisphenol F epoxy resin material, epoxy phenol novolac material and epoxy cresol novolac material (e.g., as produced by reaction of phenols with formaldehyde and subsequent glycidylation with epichlorohydrin), aliphatic epoxy resin material (e.g., as produced by glycidylation of aliphatic alcohols or polyols), and glycidylamine epoxy resin material (e.g., as formed when aromatic amines react with epichlorohydrin).

In various examples, the thermoset coating is a cross-linked epoxy coating. The coating may be a fusion-bond epoxy coating. In some embodiments, the thermoset coating is made from a powder, such as an epoxy powder, that is subsequently cured/cross-linked to form the thermoset coating, while in others it is made from a liquid precursor. In various examples, the coating is made from a powder comprising an epoxy resin and one or more curing agents or hardeners. The curing agents or hardeners may consist of or comprise one or more amines (e.g. aromatic amines, aliphatic diamines), anhydrides, acids, phenols, alcohols and/or thiols. In some examples, the powders further comprise one or more fillers and/or one or more pigments, or other additional components. In certain examples using fusion-bond epoxy coating, the thermoset coating is made from 3M® Fusion Bonded Epoxy 413, 3M® Scotchkote 426 FAST, and/or Axalta Alesta 74550.

The cross-linked thermoset coating provides high strength and durability for use in applications where the coating is exposed to abrasion forces, for example providing higher durability than nylon coatings and/or thermoplastic coatings that are known in the art. Use of certain epoxies identified above may also advantageously provide strong adhesion to the article substrate (as compared to nylon thermoplastic coatings), good resistance to impact and/or improved scratch/abrasion resistance. For example, example articles having 3M® Fusion Bonded Epoxy 413 to form the thermoset coating revealed, based on microscopy analysis, only top surface scratches after repeated insertions by components that could result in removal of nylon thermoplastic coatings in areas that came into contact with the articles.

In various embodiments, the article further comprises a lubricant coating in contact with at least a portion of the article. In some examples, the lubricant coating covers or is in contact with at least a portion of the thermoset coating, while in others it covers the entire article and/or the entire surface of the thermoset coating. In some examples, the lubricant is applied to surfaces, such as on bolt threads and bearing surfaces that are exposed to forces during use of the article, such as a fastener. As one representative example, the coated article 20 shown in FIG. 2 may have lubricant coating only on the surfaces of the fastening assembly (e.g. coated wear surfaces 26 and 28 and a coated connecting portion 27) or may only have a lubricant coating on the surface experiencing the highest forces, in this example the connecting portion 27. The lubricant may be a solid or liquid lubricant. In some embodiments, the lubricant coating consists of or comprises one or more waxes, for example one or more polyethylene wax, paraffin waxes, carnauba waxes, a solid lubricant such as molybdenum disulfide, or one or more a fluoropolymers (e.g. polytetrafluoroethylene). In the bolt of FIG. 1, the lubricant may be present on the threads 5, to achieve a desired coefficient of friction, and/or on the underside of the flange 3.

In some examples, the thermoset coating has a substantially uniform thickness. In various embodiments, the coating thickness (regardless of the geometry and/or shape of the article) only deviates from about 0.002 inches or less from the overall average coating thickness, while in others about 0.001 inches or less, in still others about 0.0005 inches or less. In certain embodiments, the thermoset coating thickness is about 0.005 inches, inches or less, while in others it is approximately 0.0035 inches or less, or approximately 0.0025 inches or less, or approximately 0.0015 inches or less, or approximately 0.0010 includes or less, or approximately 0.0005 inches or less. In various embodiments, the thickness is between approximately 0.0005 to 0.005 inches, approximately 0.0015 to 0.0035 inches, and approximately 0.0025 inches.

In certain examples, the article comprises an inorganic coating, such a ceramic coating, and/or is electroplated and/or plasma-treated, for example the article may comprise a Keronite® coating. In some examples, an aluminum article is coated with the Keronite® coating, where it may be used in conjunction with a magnesium article, which, as a skilled artisan would understand, is pre-disposed to galvanic corrosion given its position on the anodic index. By coating the aluminum fastener, which will act as the cathode, these examples provide a barrier to prevent galvanic corrosion, even with a material such as magnesium. This advantageously allows coupling of magnesium parts without the use of expensive components as is currently known in the art. Moreover, by coating the aluminum cathode, these example may avoid potential problems resulting from coating the magnesium component, as any minute hole in the magnesium's coating results in galvanic corrosion in a concentrated areas of the magnesium (as it degrades by virtue of being the anode in the galvanic cell) which can detrimentally weaken structural integrity of the part, especially if the concentrated corrosion is at an important location of the part. In yet other examples, a magnesium surface may be coated as described here, for example with a ceramic coating, and in some examples, both an aluminum piece and a magnesium piece may be coated and used together, to further inhibit the possibility of corrosion. Any of these examples may also comprise one or more of the thermoset coatings described herein and/or one or more lubricant coatings on top of the, e.g., ceramic coating. This may result in additional benefits when the inorganic coating is somewhat porous or otherwise has surface irregularities (but still provides a coating sufficient to prevent galvanic corrosion). For example, a Keronite® ceramic coating has pores that may be filled with the thermoset coating to help promote adhesion and provide a more comprehensive galvanic barrier.

In certain examples, the thermoset coated article has a heat resistance such that it may be exposed to elevated temperatures for extended time periods without adverse effects to the coating, such as softening, melting, flowing, dripping, charring and the like. For example, in certain embodiments the coated article is capable of withstanding approximately 350 degrees Fahrenheit for approximately thirty minutes without adverse effects to the coating. The epoxy thermoset resins identified above, for example 3M® Fusion Bonded Epoxy 413, 3M® Scotchkote 426 FAST and/or Axalta Alesta 74550, provide coatings having these improved levels of heat resistance, meaning the coatings will not melt and/or flow out when exposed to these types of heat conditions. This can, for example, be helpful in embodiments where the coated article is exposed to additional manufacturing processes. A steel clip designed to hold an aluminum fender to an automobile body is one example of such an embodiment, as these components may be exposed to elevated temperatures (including the thirty minute, 350 degree Fahrenheit conditions noted above) during production of the automobile.

Figure 3:
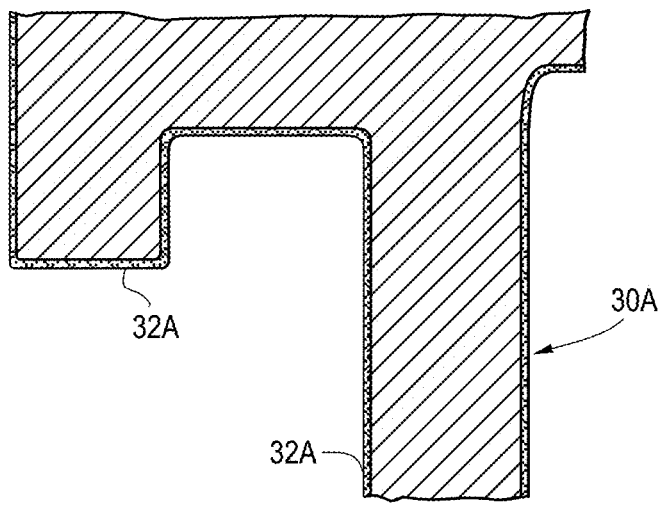
FIG. 3 shows a view of a cross-sectioned example article of this disclosure after a thermoset coating was applied.
Figure 4:
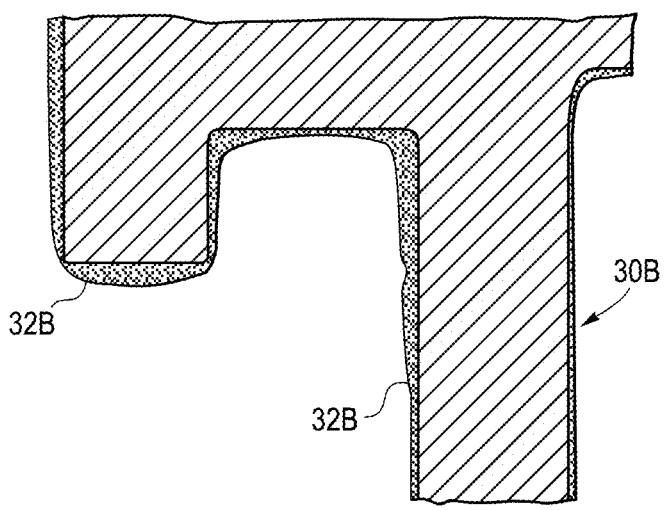
FIG. 4 shows an illustration of an example article coated with a different thermoset coating that is not as consistent in regard to thickness as the thickness of the present thermoset coating.

FIGS. 3 and 4 provide example views of articles coated with example materials 3M® Fusion Bonded Epoxy 413 (FIG. 3) and 3M® Scotchkote 426 FAST (FIG. 4). In the example of FIG. 3, a steel fastener 30A was coated with a layer of 3M® Fusion Bonded Epoxy 413 and heated to cure temperature via induction heat, providing a substantially uniform thermoset coating 32A (the outer material). In the example of FIG. 4, a steel fastener 30B was coated with a layer of 3M® Scotchkote 426 FAST and heated to cure temperature via induction heat (requiring a higher cure temperature as compared to the example shown in FIG. 3, e.g. about degrees 450 degrees Fahrenheit compared to about 425 degrees Fahrenheit), providing thermoset coating 32B (the outer material, which does not have as uniform of a thickness when compared to the example of FIG. 3).

In some embodiments, the article is a fastener, for example a bolt, clip or shank. The article may consist of or comprises any metal or metallic alloy. In certain embodiments, the article is steel. In others, such as but not limited to the articles that also comprise a ceramic coating, it is magnesium, aluminum, titanium, or alloys thereof. In some examples, the article consists or comprises steel, stainless steel, titanium, nickel, copper, bronze, brass, tin, lead, iron, aluminum, zinc, magnesium, or alloys thereof. Such a clip may be, for example, a steel clip that may be used to mount an aluminum fender onto a vehicle. Such a clip may be entirely coated with the example 3M® Fusion Bonded Epoxy 413, 3M® Scotchkote 426 FAST and/or Axalta Alesta 74550, but other cross-linked thermoset resins would be useable as described herein, or it may be partially coated, for example on a single surface or a subset of all the surfaces.

In certain examples, the thermoset coating comprises a first thermoset coating, and a second thermoset coating is applied to the article on top of the first thermoset coating, a portion thereof, or the entire surface of the article, including any portions already covered by the first thermoset coating. In various examples, the first thermoset coating is a rapid-cure thermoset coating and the second thermoset coating is not a rapid-cure thermoset coating. For example, in some embodiments the first thermoset coating cures in about one minute or less when exposed to an induction heater while in contact with the metal article, while the second thermoset coating requires a longer cure time at an equivalent temperature range used for curing the first thermoset coating, for example ten minutes or more, or fifteen minutes or more. In some examples, the second thermoset coating comprises one or more epoxies, polyesters or polyurethanes, while in others the second coating comprises an epoxy/polyester mixture. In one example, the second thermoset coating is made from a Valspar® TGIC polyester powdered (such as PRA60001).

As one example, the polyester material, when applied as the sole coating, had poor impact resistance when coated onto a steel fastener—but when applied on top of another thermoset coating, in this example the 3M® Fusion Bonded Epoxy 413, the results were surprisingly different. The combined coatings exhibited high impact resistance, even when the polyester material was not completely cross-linked (for example, because it was only exposed to induction heat for the same of time used to cure the rapid-cure thermoset resin), and surprisingly had high adhesion despite the incomplete cure to the lower thermoset coating, such as an epoxy.

Therefore, in various examples, the second thermoset coating is only-partially cross-linked, for example when it is exposed to heat for a period of time shorter than necessary to achieve full curing. This advantageously still allows traditionally slower curing materials to be incorporated into a high speed, high volume manufacturing process when desired, but still providing an improved and strengthened coated article. In certain of these examples, the base, rapid-cure thermoset coating material is applied, quickly cured via heat such as induction heat, and then the second coating material was applied and partially cured (or, in some examples, entirely cured despite the longer cure times needed). These examples comprising a second thermoset coating may also comprise the lubricant coating.

These descriptions of the article are merely exemplary. In certain embodiments, the article comprises additional combinations or substitutions of some or all of the components described above. Moreover, additional and alternative suitable variations, forms and components for the article will be recognized by those skilled in the art given the benefit of this disclosure.

Other aspects of the disclosure relate to an assembly. The assembly may comprise a first article and a second article configured to be fastened, connected, or in close proximity to the first article, wherein the two articles have dissimilar electro-potentials (anodic indices) such that galvanic corrosion may occur when the articles are in the presence of an electrolyte. The first article may be partially or entirely coated with one or more thermoset coatings, such as any of the coatings described above or elsewhere in this disclosure, and optionally a lubricant coating.

Figure 6A:
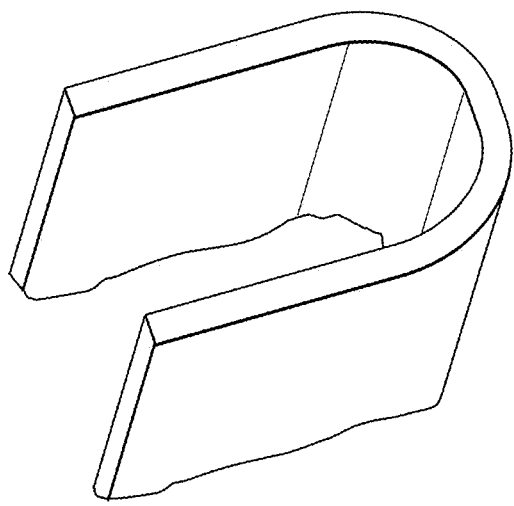
FIGS. 6A, 6B and 6C show illustrations of example components of an assembly of this disclosure, or assembled components of the example assembly, where FIGS. 6A and 6B provide views of a non-thermoset coated article configured to be fastened to a coated article as illustrated in FIG. 6C.
Figure 6B:
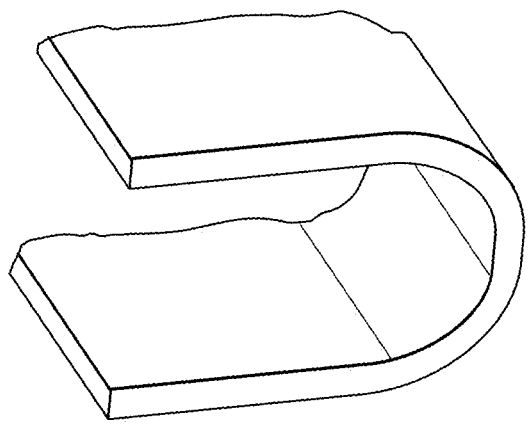
Figure 6C:
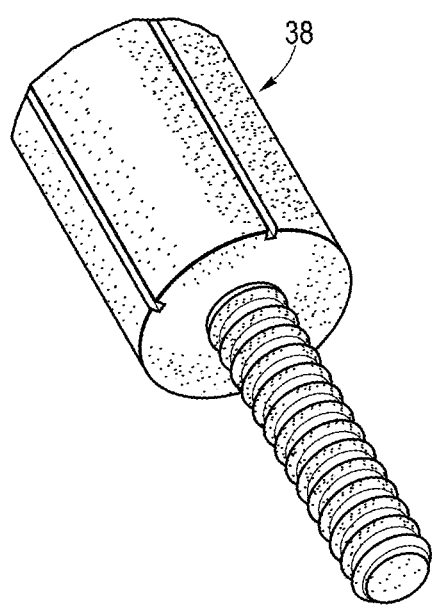

In certain examples, the second article comprises, is connected to, or is configured to be connected to a third article (such as an automobile or a component thereof). Assemblies having an article with one or more coatings as described herein may comprise automotive or aerospace materials such as, fasteners, clips or other connection materials. Still other possible articles for use in the assemblies may be a fastener for a decorative automotive applique, or other automotive material such as but not limited to a fastener, clip or securing article for use with a fender or an oil pan, including a magnesium oil pan. For example, FIG. 6 shows illustrations of an applique assembly, where FIGS. 6A and 6B provide views of a non-coated article, a chrome-plated applique 38, configured to be fastened to a coated fastener as shown in FIG. 6C, where the fastener is identical or substantially similar to the coated article 20 from FIG. 2.

Figure 7:
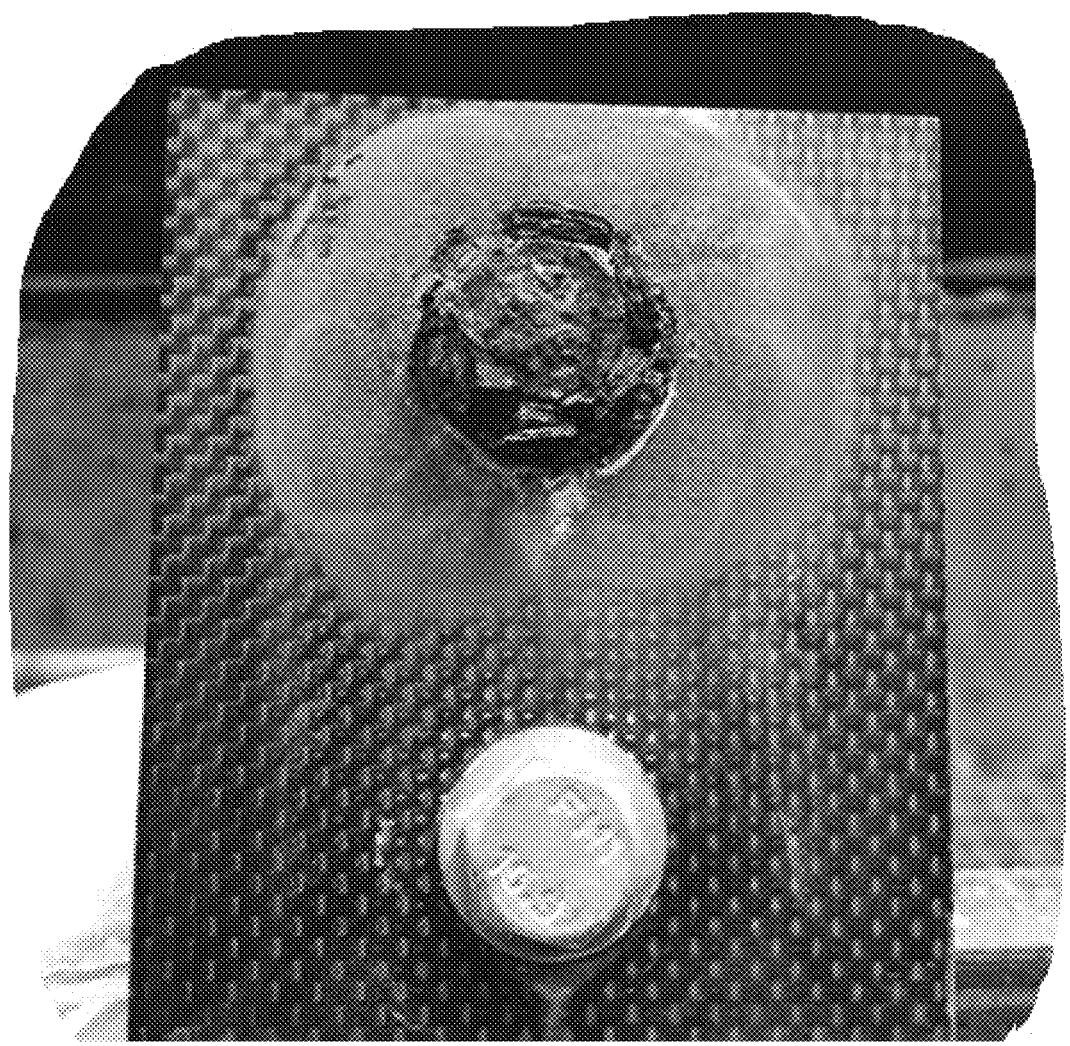
FIG. 7 is a photograph of a testing assembly in which two sample steel bolts are mounted to a carbon fiber sample panel, the bolt in the bottom of the figure having a thermoset coating according to an embodiment of the preset disclosure and the bolt in the top of the figure having no such coating.

FIG. 7 is a photograph that illustrates an example in which two sample steel bolts are mounted to a carbon fiber sample panel following a simulated 15 year test in a corrosive environment under standard GMW17026. The upper bolt in the photograph is not coated with the thermoset coating, whereas the lower bolt in the photograph is coated with the thermoset coating. It is readily apparent that there is significant corrosion of the uncoated bolt and that there is little to no corrosion exhibited by the thermoset material coated bolt. It will thus be appreciated that the sample bolts in the photograph illustrate the significant corrosion resistance provided by the present thermoset coating.

These assembly descriptions are merely exemplary. In certain embodiments, the assembly comprises additional combinations or substitutions of some or all of the components described above. Additional and alternative suitable variations, forms and components for the assemblies will be recognized by those skilled in the art given the benefit of this disclosure. Moreover, any of the features discussed in the exemplary embodiments of the article described above may be features of embodiments of the assembly or components thereof, and vice versa.

Still other aspects of the disclosure relate to a process. In some examples, the process comprises applying a powder coating to an article (for example by spraying the powder coating onto the article). The powder precursor material may be suspended in a stream of air and sprayed onto the article using suitable spray guns, which may ionize the powder so that the powder properly coats the metal article prior to curing. In some embodiments, a tribo charging process is used to ensure the recessed or other difficult to reach areas properly receive the powder coating, as use of heavy electrostatic forces results in a cage effect that prevents the powder from coating these areas as needed. In certain examples, a powder goes through a thermoplastic material in the spray gun to achieve the desired charge. Other application methods are possible, however, for example the article may be dipped into a bed of the powder precursor. For embodiments where difficult to reach surfaces or internal surfaces need to be coated, additional spray gun attachments or extensions may be used. In other examples, a shield or shields may be positioned between the spray gun and the articles such that only a certain portion or portions of the article to be covered in powder (and therefore, ultimately, coated by the thermoset coating). In certain examples, the article is cleaned and/or scratched and/or otherwise primed to promote adhesion of the coating precursor material prior to curing.

The process may also comprise heating the powdered article. In some examples, the process may comprise transporting the powdered article to a heat source, such as an induction heater applying a magnetic field. In certain examples, a metal article is at room temperature or ambient temperature, the powder is applied to the metal article, and then the article and powder are heated, for example by exposure to an induction heater, such that the powder cures into a cross-linked thermoset coating. In other examples, the article may be heated in the same location where the powder is applied, or the article may be heated prior to application of the powder, so any residual heat in the metal provides the cure or at least partially cures the powder. Embodiments of the process where the powder is applied to a room temperature article are preferred, however, given the relative simplification of the manufacturing process provided.

Figure 5:
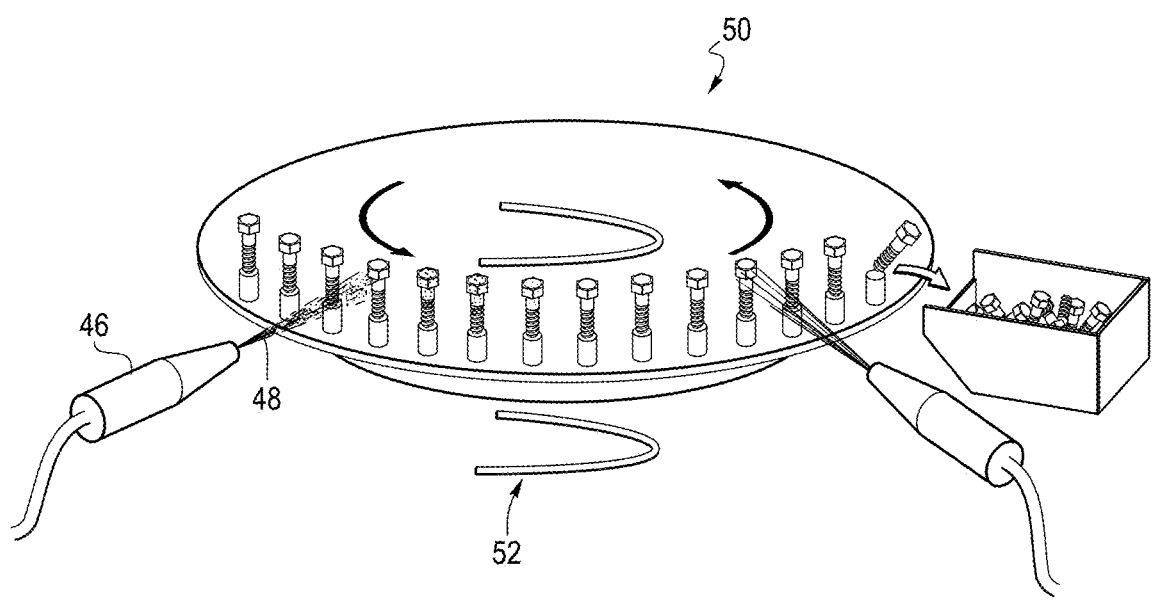
FIG. 5 illustrates an example production setup for performing certain embodiments of the processes of this disclosure.

The articles may be transported (for this step or otherwise) using any known conveyance system in the art, such as a conveyor belt, one or more gripper wheels, a rotary bench, or, as in the example illustrated in FIG. 5, a magnetic table 50. In some examples, the conveyor brings the articles inside and through a heat source, such as an induction heater 52. In other examples, one of more components may be moved or transported into proximity to the article, which remains stationary, such as a powder spray gun 46 where the powder 48 is applied to the articles. An air stream (not shown) may be used to blow off excess material from the articles.

Other possible heating methods include use of infrared heat and/or other thermal radiation, a curing oven, a heat tunnel, a heat gun, or bringing a heat source into direct contact with the article to transfer heat via conduction, and the like. The temperature used to cure the powder may be any of those described previously (i.e. between about 350 to 490 degrees Fahrenheit, or about 425 degrees Fahrenheit, or others) depending on the characteristics of the coating material (e.g. the resin and any curing agent(s) composition) and particular process.

For example, in some embodiments, heat is applied for five or less seconds, in others ten or less seconds, and in others fifteen seconds or less, thirty seconds or less, sixty seconds or less. In other examples, such as processes using longer-cure materials or lower temperatures, longer times on the order of minutes (e.g. two minutes or less, five minutes or less, ten minutes or less, fifteen minutes or less, or thirty minutes or less) may be needed. Embodiments allowing full cure, or nearly full cure of at least the base thermoset layer on shorter time ranges, however, are preferred given the advantages provided in manufacturing speed.

The process may further comprise transporting the coated article to a lubricating station, where one or more lubricants (e.g. a polyethylene wax emulsion) are applied to the article, for example through spraying or dipping. The process may also comprise drying the lubricated article, for example through another application of induction heating or use of another heat source (or even the same heat source used to cure the resin into a cross-linked material). In various examples, additional heat is not provided and the articles air dry, or no drying is needed based on the choice of lubricant (e.g. when a dry lubricant such as molybdenum disulfide is used). In some embodiments, a shorter application of heat is all that is necessary to dry the lubricated article, for example a one to two second application of induction heat. This helps further the manufacturing efficiencies of the process.

In some examples, prior to lubrication, a second thermoset coating material is applied and at least partially cured on the article. In certain examples, the process may comprise forming a ceramic coating on the article, and then applying one or more thermoset coatings (for example, a rapid-cure then a non-rapid cure thermoset coating) and then optionally applying one or more lubricant coatings.

As noted above, FIG. 5 illustrates an example system for performing embodiments of the method. In this example, the system comprises a magnetic table holding and transporting a plurality of articles, which are at room temperature in these embodiments. In step A of this example process, a spray gun applies the powder precursor material (e.g. the powdered epoxy) to the article, which is then conveyed to a location between induction heaters. In step B, the heater applies heat to cure the powder and result in a cross-linked thermoset coating on the article. Optionally, the magnetic table then conveys the coated articles to a lubricant applicator, such as a spray gun, which applies the lubricant in step C. Then the magnetic table conveys the finished articles to a finish location for removal from the table in example step D. It will be appreciated that the process permits selectively applying the coating to, for example, the head of the bolt, the head and flange (if present) of the bolt, the underside of the head and, if desired, to the threads or a portion of the threads of the bolt.

Various samples of assemblies were tested to determine the effectiveness of coating one of two articles of the assembly with a material that is capable of preventing galvanic corrosion. The material that was coated onto the articles was a fusion bonded, cured, thermoset polymeric material, Axalta Alesta 74550, applied using a tribo charge process to a thickness of about 0.0025 to 0.0035 inches when cured. All of the testing was conducted using M10 fasteners (bolts) with a 10 micron Dipzol NZ-200 alkaline plating secured to magnesium and carbon fiber panels. The tests included accelerated corrosion testing in accordance with General Motors Worldwide Engineering Standards test procedure GMW17026, "Accelerated Corrosion Laboratory Test for Galvanic Corrosion Mechanisms" (corrosion testing), tension loss testing and physical measurements to determine adequacy of coating relative to mechanical requirements of the assembly.

The corrosion testing was carried out using bolts mounted to sample panels (coupons) of magnesium and carbon fiber. One of the bolts on each coupon was coated with a fusion bonded, cured, thermoset polymeric material and a control bolt on each coupon was uncoated. The coupons were positioned on a plastic grid in a stainless steel chamber and subjected to a direct spray of a solution of 3% salt, 3% fire clay and 94% water at a temperature of 66° C. (about 150.8° F.) for 2 minutes every 3 hours. The spray was applied at a rate of about 2.5 liters (L) per minute per nozzle. The coupons had an initial thickness of about 3 millimeters (mm) prior to exposure to the spray solution.

Figure 9A:
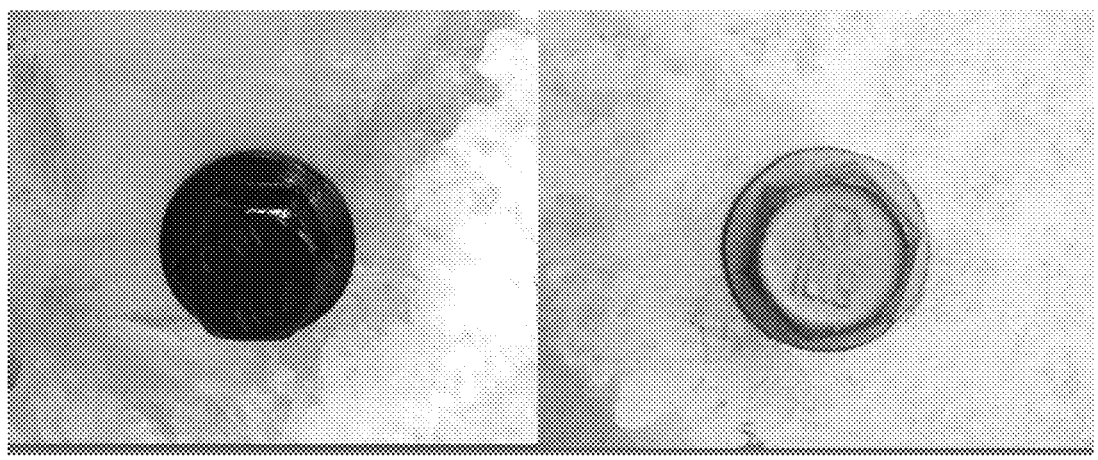
Figure 9B:
Figure 9C:
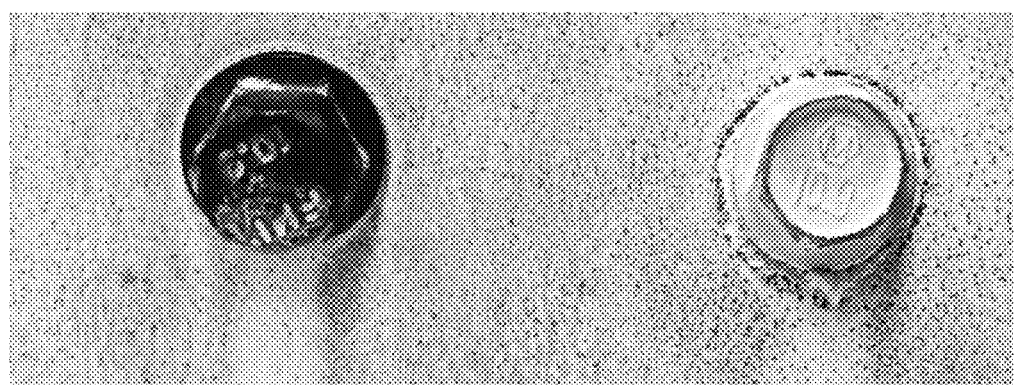
Figure 9D:
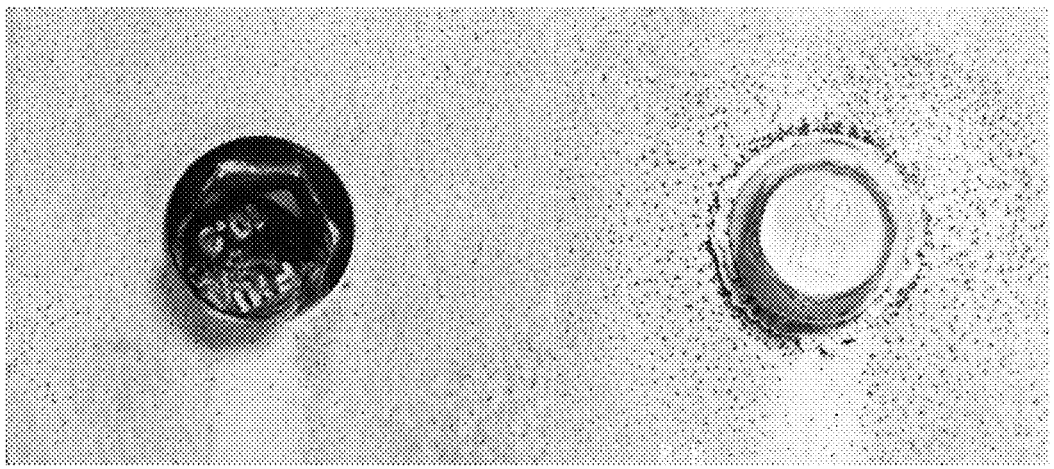
Figure 9E:
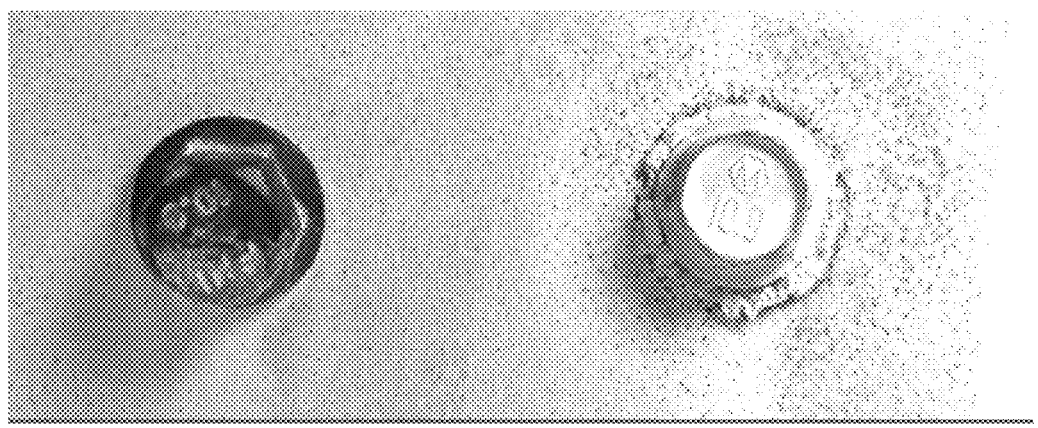
Figure 9F:
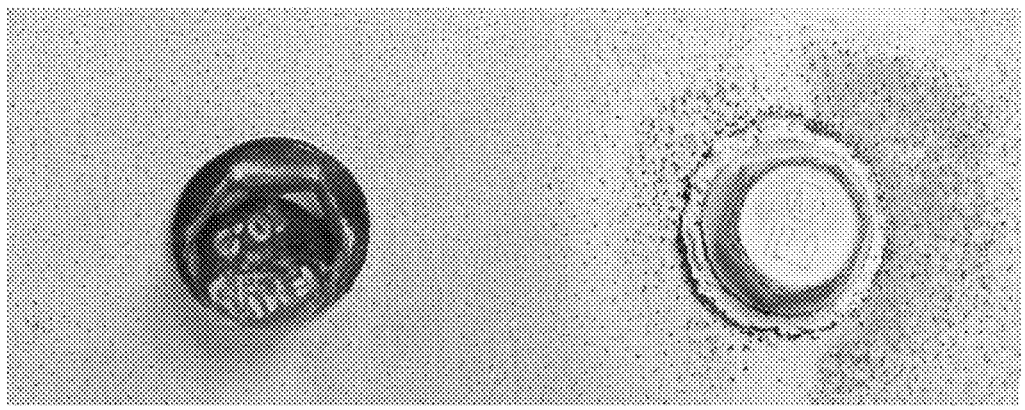
Figure 9G:
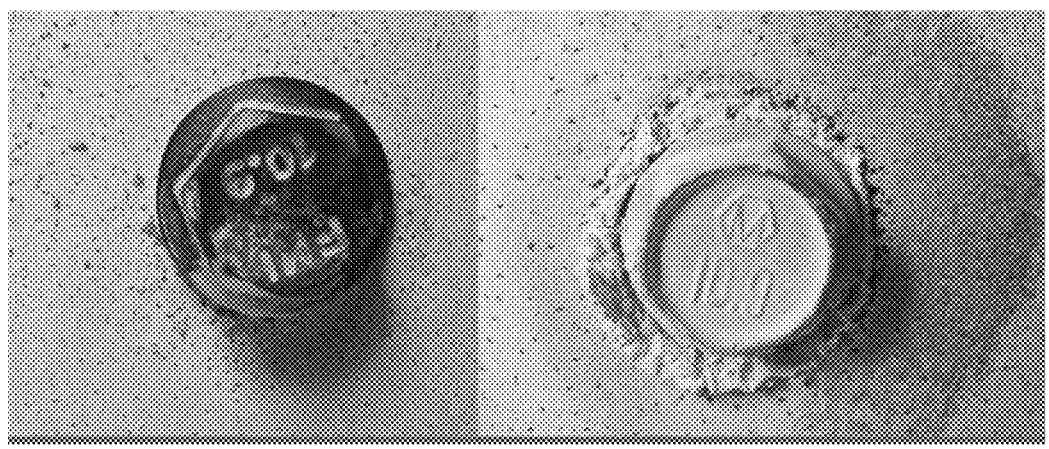

The corrosion testing simulated 1, 2, 3, 4, 5, and 8-9 year exposure of the magnesium coupons by subjecting the coupons to spray for 5 days (1 year simulation), 10 days (2 year simulation), 15 days (3 year simulation) through 35 days (8-9 year simulation). The testing was suspended after 35 days (8-9 year simulation) as the nut on securing the control bolt corroded through the magnesium coupon. Photographs showing the visual results of the testing are provided in FIGS. 9A-9G, in which FIG. 9A shows the coated and uncoated bolts, on the left-hand side and right-hand side of the photographs, respectively, unexposed or prior to testing, and FIGS. 9B-9G show the bolts after 1 year, 2 year, 3 year 4 year, 5 year and 8-9 year simulated exposure. As will be readily apparent from the photographs, the magnesium coupon with the coated bolt exhibited little to no signs of corrosion after 35 days (8-9 year simulation) in the corrosion test chamber, whereas the coupon on which the uncoated was mounted exhibited extreme corrosion and, as noted above, required that the testing be suspended due to failure of the coupon (magnesium) material as a result of contact of the coupon with an untreated nut on the rear side of the coupon. In this case, galvanic corrosion occurred in the magnesium coupon in that magnesium is more active, or less noble, than the steel and thus serves as the anode in the galvanic reaction.

Figure 10:
FIG. 10 is a photograph of a magnesium coupon with an undistressed uncoated bolt (right-hand side) and an undistressed thermoset coated bolt (left-hand side) mounted to a coupon, following 15 year simulated exposure texting in a corrosive environment under standard GMW17026.

FIG. 10 is a photograph showing a coupon after simulated 15 year exposure of the magnesium coupon. As can be readily seen, at 15 year simulated testing, the area of the coupon around the thermoset coated bolt exhibited essentially no pitting, whereas the area of the coupon around the uncoated bolt exhibited extreme pitting and was found to have pitted through (through the 3 mm thickness of the coupon).

At the suspension of the test at 35 day simulation, the coupons with the uncoated bolts had thoroughly pitted through (pitting of about 3 mm), as had the coupon at 15 year simulated testing, while the coupons with the coated bolts had pitted less than about 0.089 mm, or less than about 3% of the uncoated bolts.

A similar corrosion test was conducted using undistressed and distressed, uncoated and coated bolts mounted to sample panels (coupons) of carbon fiber. The corrosion testing simulated 1, 2, 3, 4, 5, 10, 11, 12, 13 14 and 15 year exposure of the magnesium coupons by subjecting the coupons to spray for 5 days (1 year simulation), 10 day (2 year simulation), 15 days (3 year simulation) through 65 days (15 year simulation). In the testing of the distressed bolts, 1 kg (about 2.2 lbs.) of bolts were placed in a hopper mounted to the top of a 150 mm (about 6 inch) tube about 1 meter (39 inches) high. A trap door at the base of the hopper was opened to allow the bolts to fall (about 39 inches) into a non-metal collection box. The drop procedure was repeated three times prior to removing the bolts for testing.

Figure 11A:
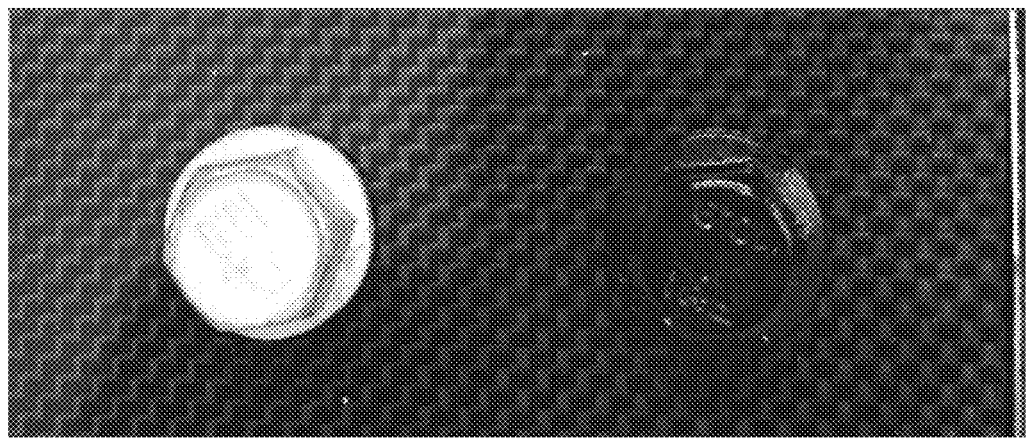
Figure 11B:
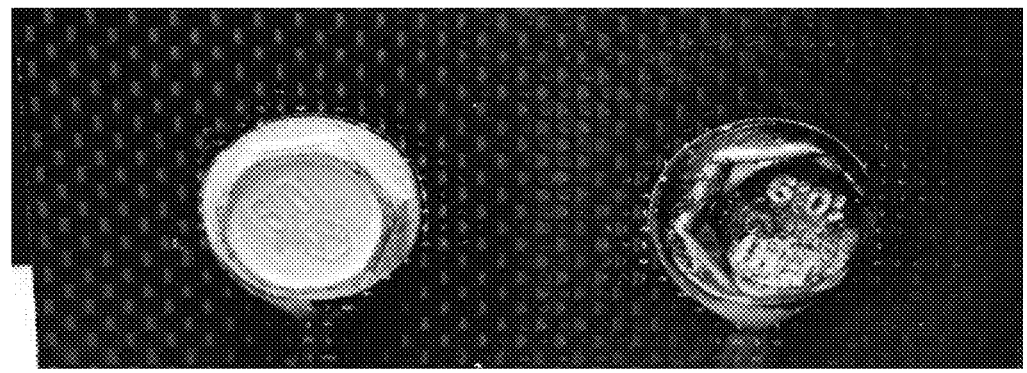
Figure 11C:
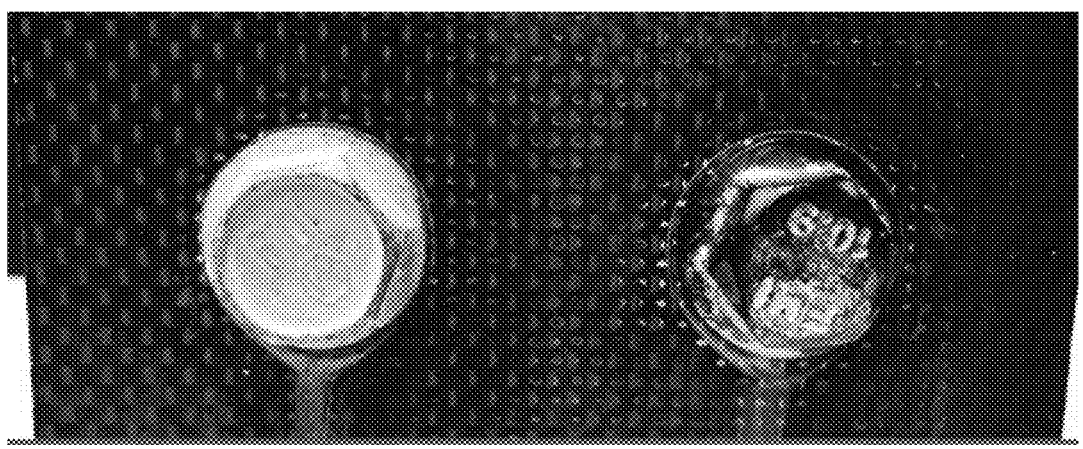
Figure 11D:
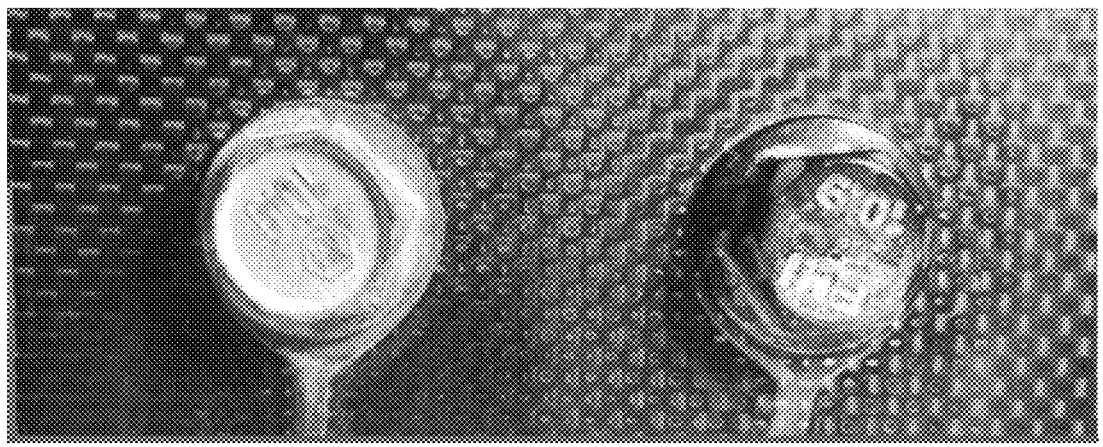
Figure 11E:
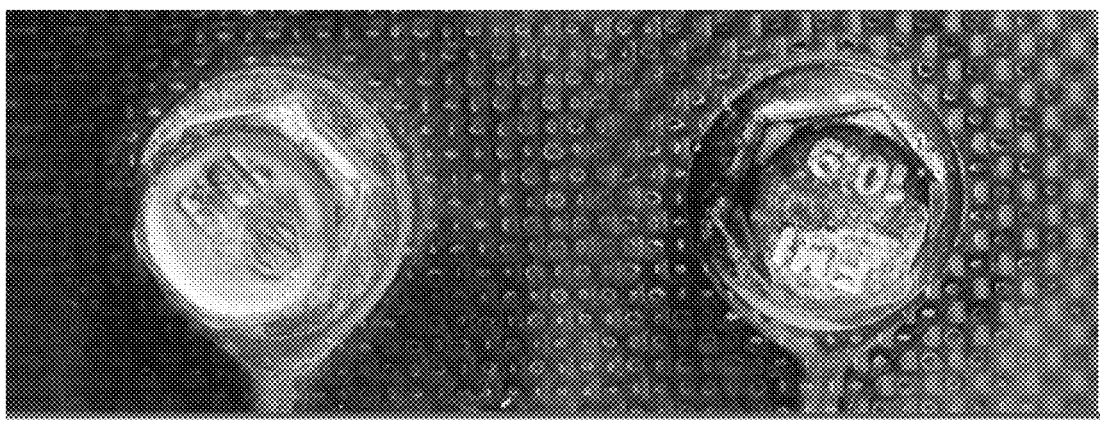
Figure 11F:
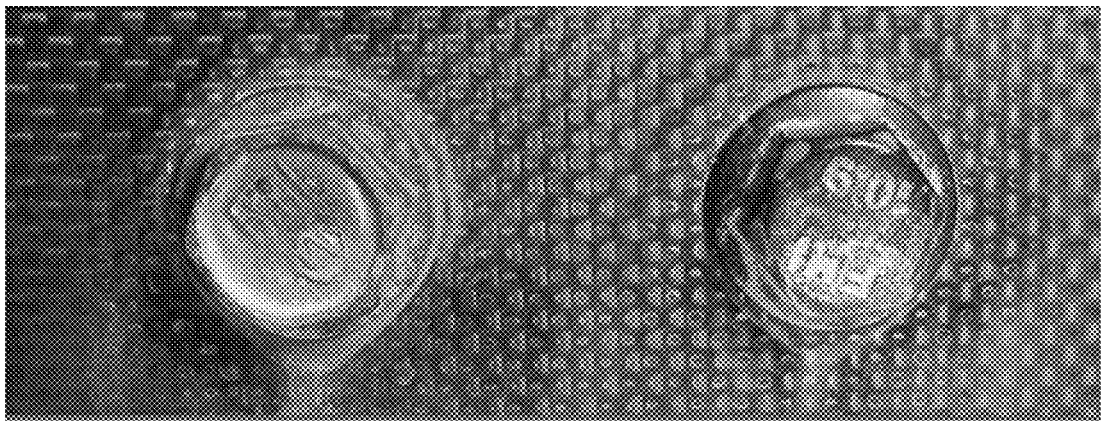
Figure 11G:
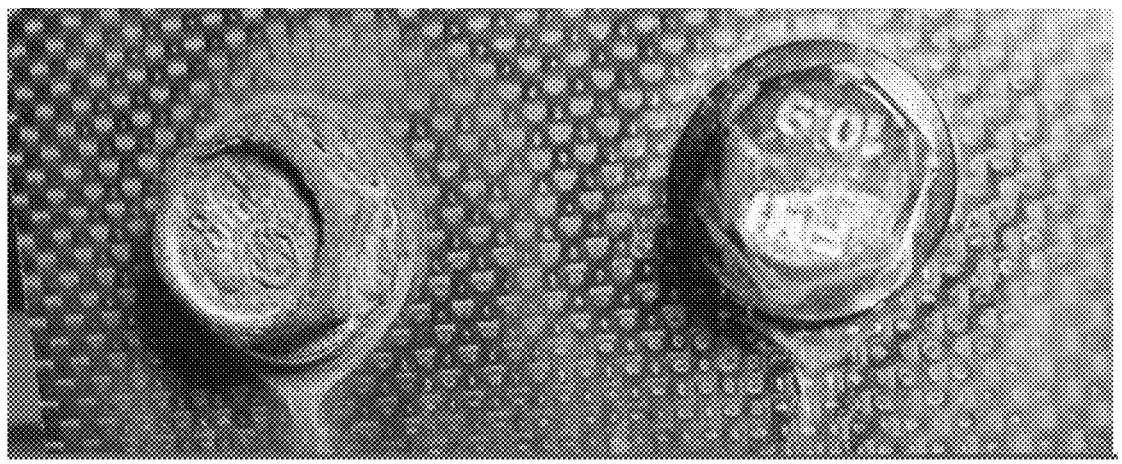
Figure 11H:
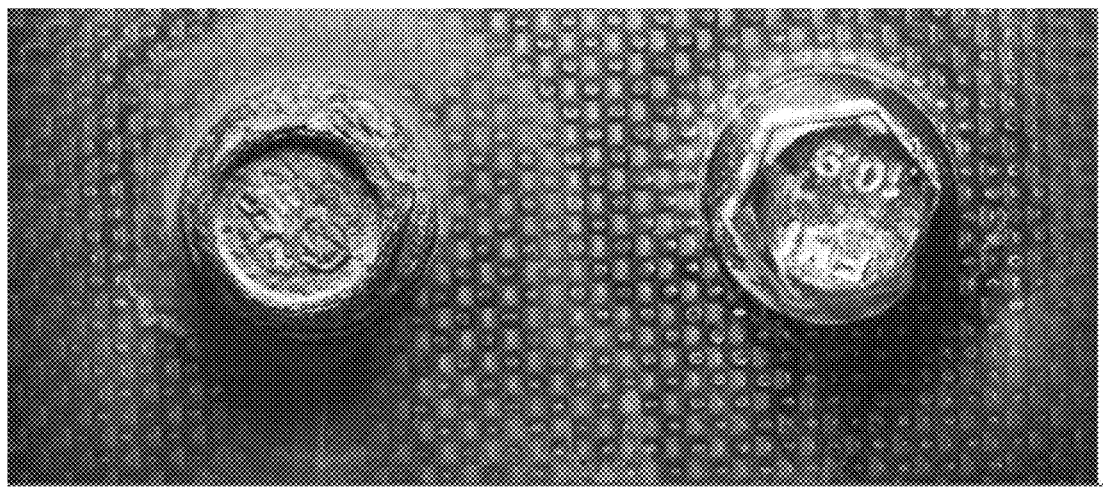
Figure 11I:
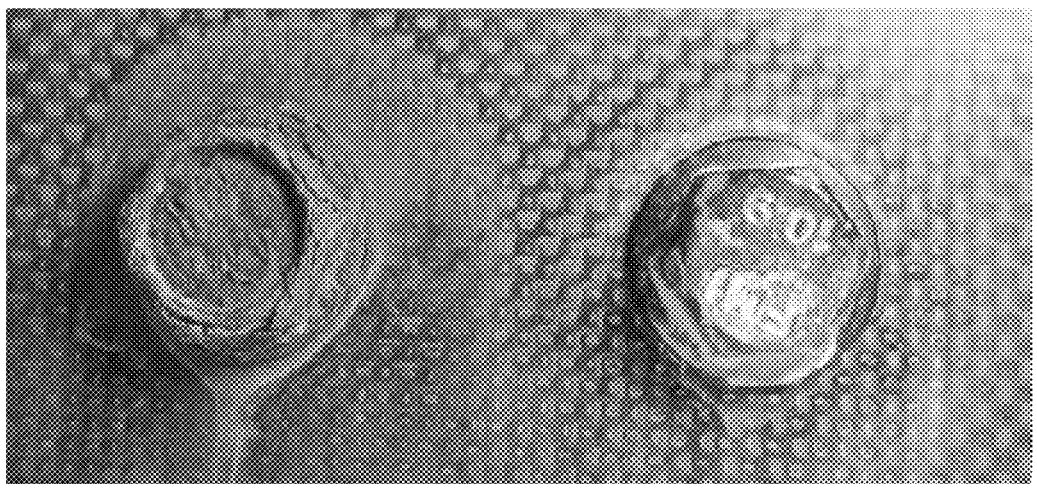
Figure 11J:
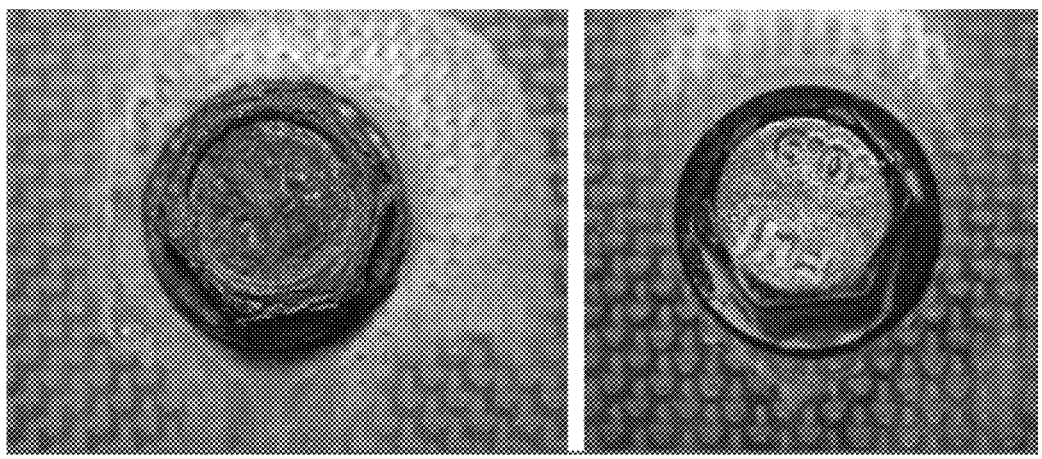
Figure 11K:
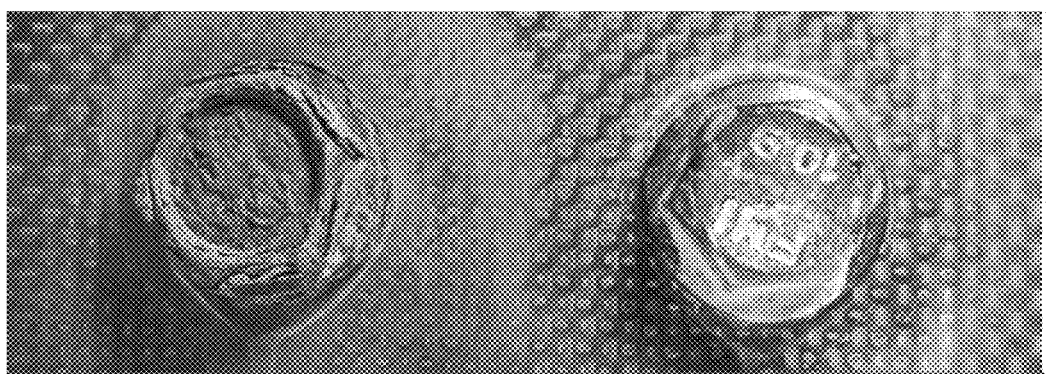
Figure 11L:
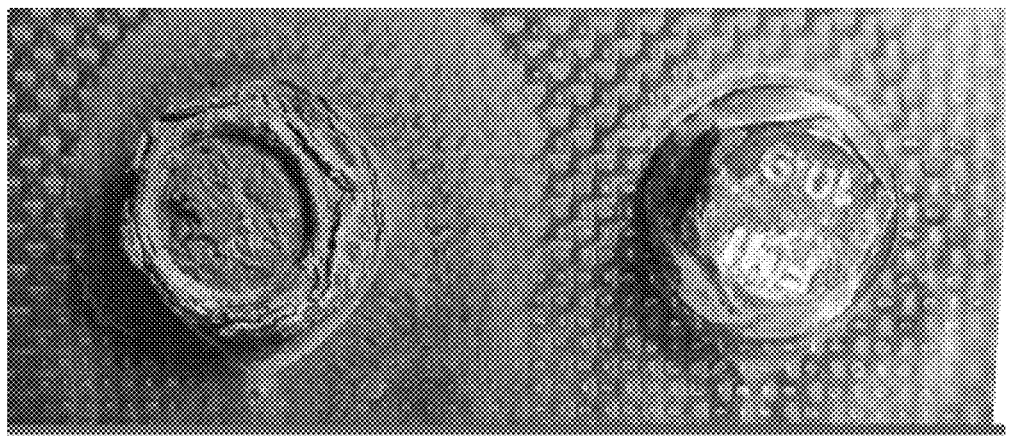

Photographs showing the visual results of the testing of the non-distressed bolts are provided in FIGS. 11A-11L, in which FIG. 11A shows the coated and uncoated bolts, on the left-hand side and right-hand side of the photographs, respectively, unexposed or prior to testing, and FIGS. 11B-11L show the bolts after 1 year, 2 year, 3 year 4 year, 5 year, 10 year, 11 year, 12 year, 13 year 14 year and 15 year simulated exposure. Again, as will be readily apparent from the photographs, the coated bolt on the carbon fiber panel exhibited significantly less signs of corrosion after 65 days (15 year simulation) in the corrosion test chamber, whereas the uncoated bolt on the carbon fiber panel exhibited extreme corrosion. An examination of the photographs (and particularly FIG. 11L) shows that the coated bolted exhibited superficial discoloration with limited spread to the carbon fiber panel to which it was mounted, whereas the uncoated bolt exhibited what appears to be significant structural degradation and significant spreading onto the carbon fiber panel.

Figure 12A:
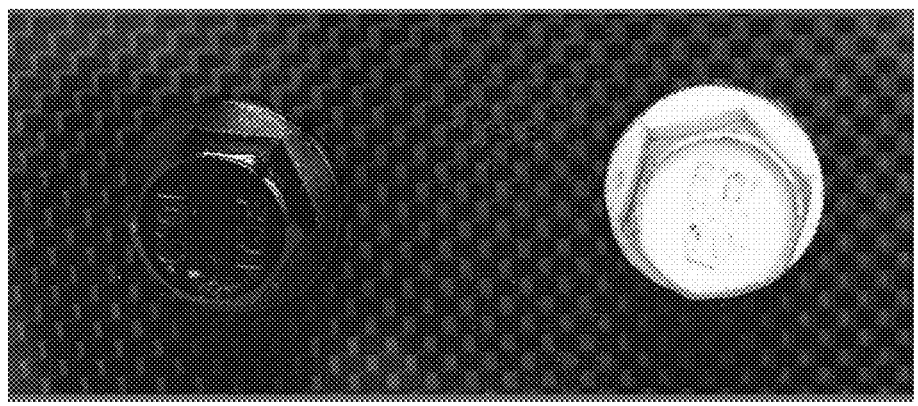
Figure 12B:
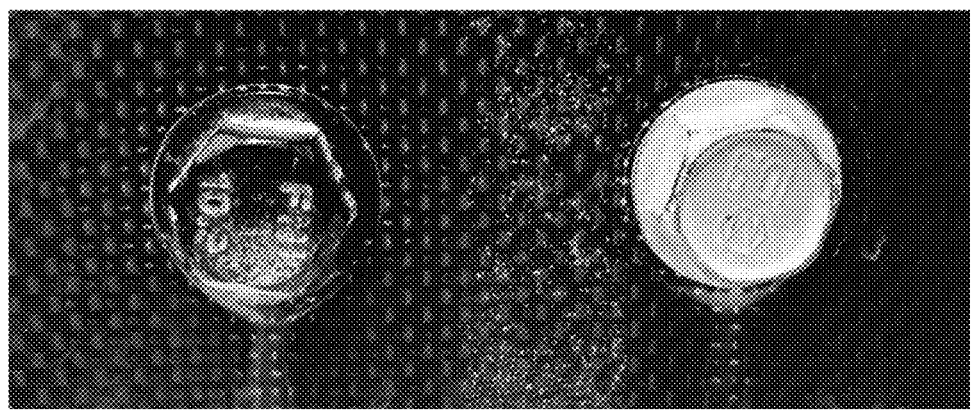
Figure 12C:
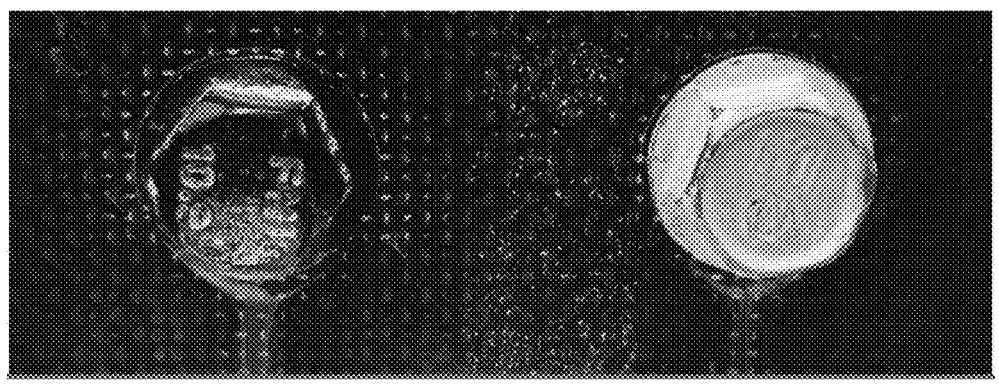
Figure 12D:
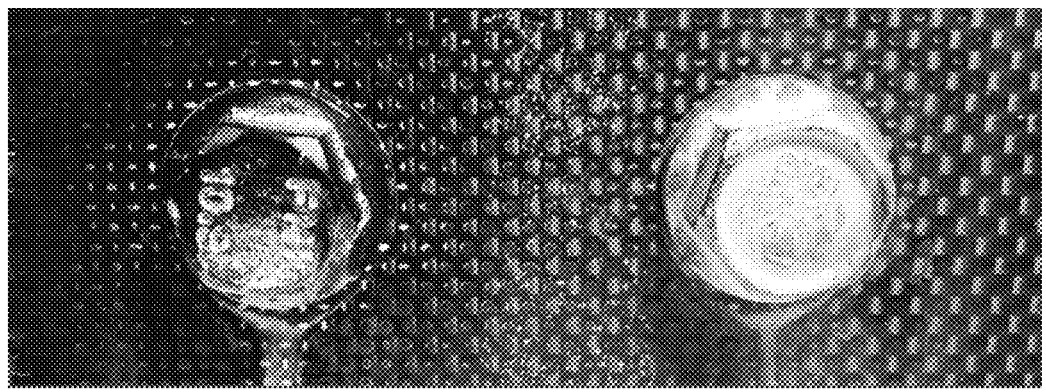
Figure 12E:
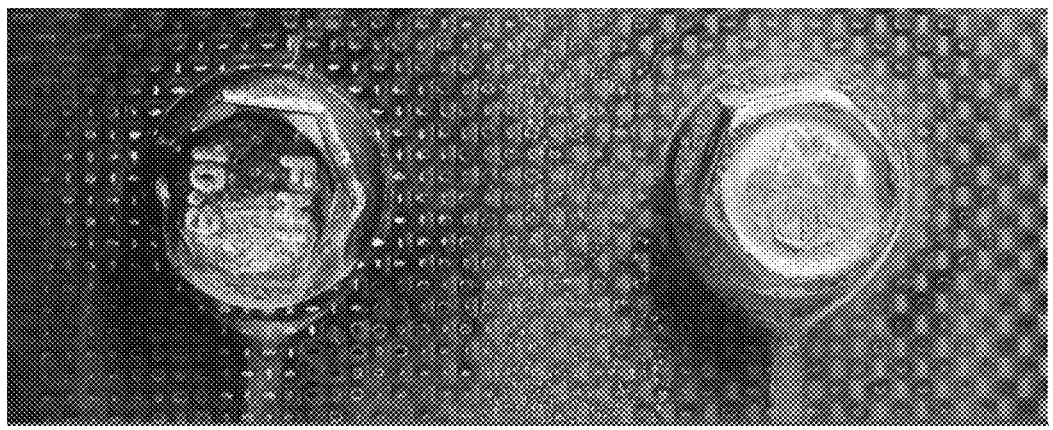
Figure 12F:
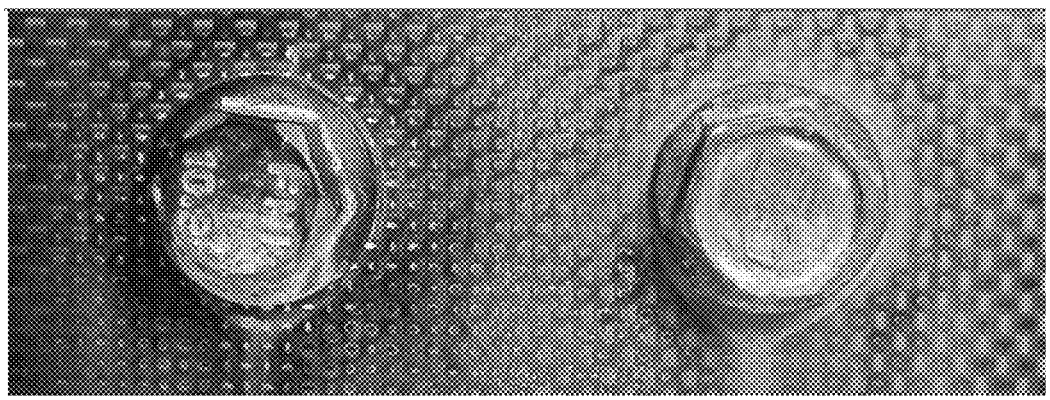
Figure 12G:
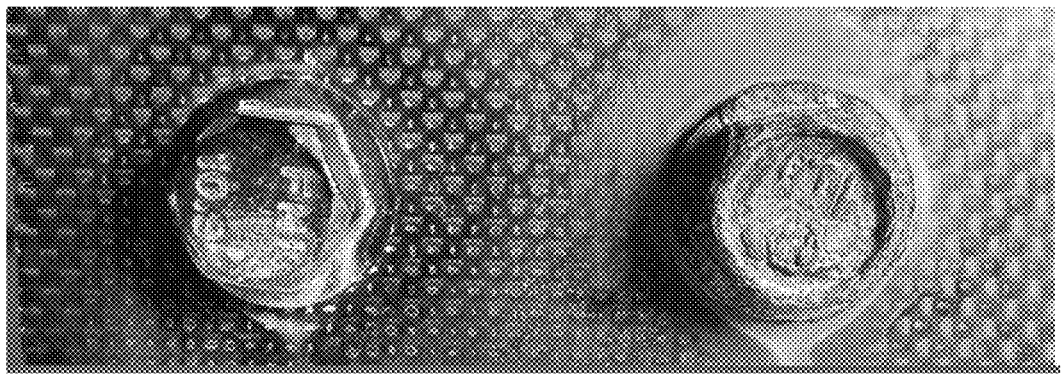
Figure 12H:
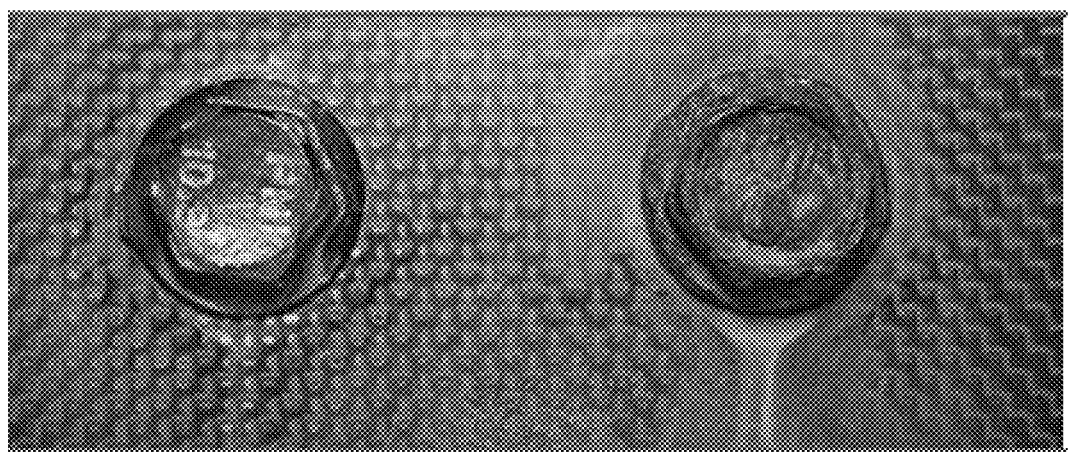
Figure 12I:
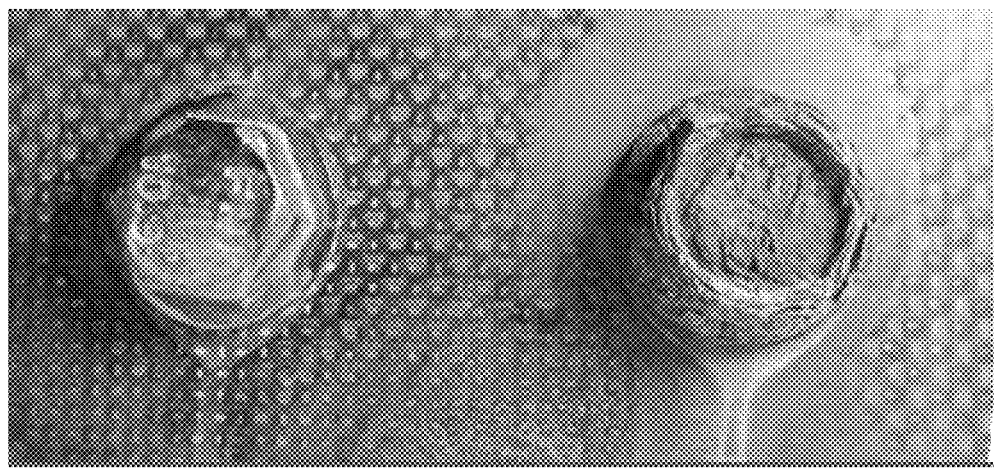
Figure 12J:
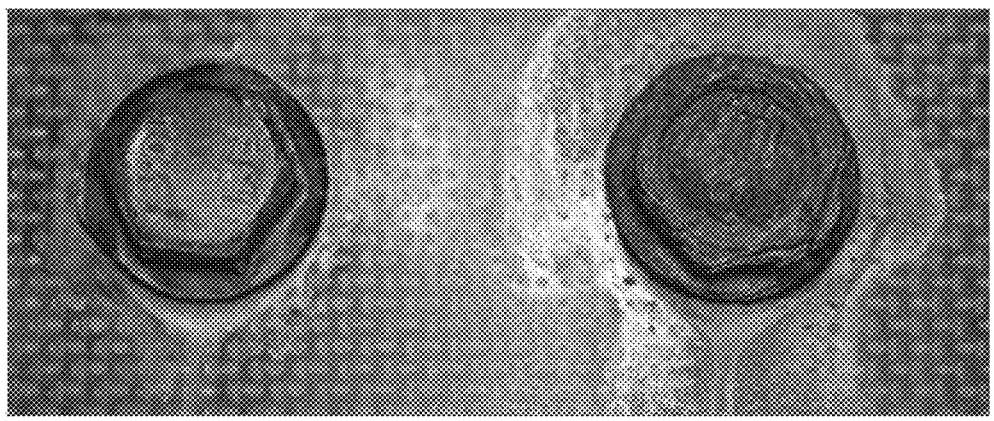
Figure 12K:
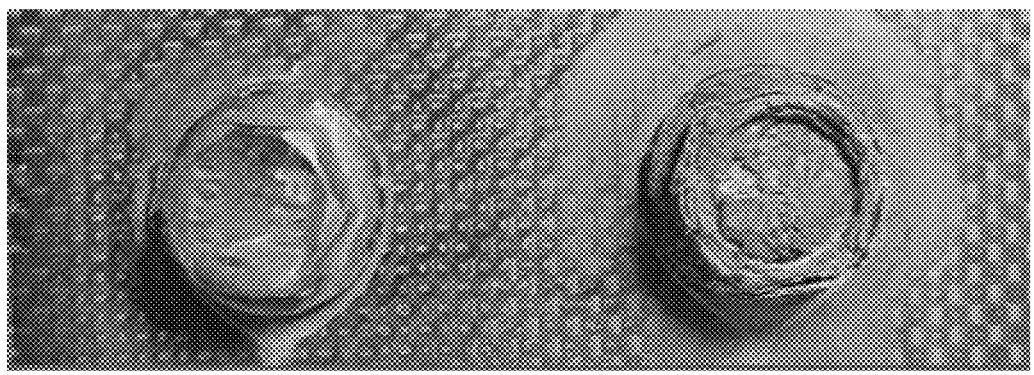

Photographs showing the visual results of the testing of the distressed bolts are provided in FIGS. 12A-12L, in which FIG. 12A shows the coated and uncoated bolts, on the right-hand side and left-hand side of the photographs, respectively, unexposed or prior to testing, and FIGS. 12B-12L show the bolts after 1 year, 2 year, 3 year 4 year, 5 year, 10 year, 11 year, 12 year, 13 year 14 year and 15 year simulated exposure. Again, as will be readily apparent from the photographs, the coated bolt on the carbon fiber panel exhibited significantly less signs of corrosion after 65 days (15 year simulation) in the corrosion test chamber, whereas the uncoated bolt on the carbon fiber panel exhibited extreme corrosion. An examination of the photographs (and particularly FIG. 12L) shows that the coated bolted exhibited superficial discoloration with limited spread to the carbon fiber panel to which it was mounted, whereas the uncoated bolt exhibited what appears to be significant structural degradation and significant spreading onto the carbon fiber panel.

In the case of the bolts in the carbon fiber coupons, it must be remembered that galvanic corrosion occurred in the steel bolt, rather than the carbon fiber coupons, in that steel is more active, or less noble, than carbon fiber and thus serves as the anode in the galvanic reaction.

Figure 12L:
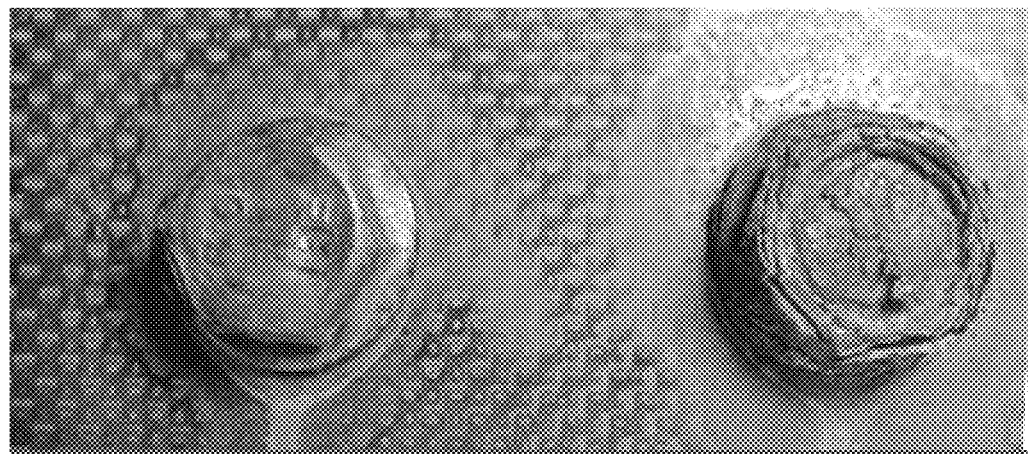

It will be appreciated that because the bolts, rather than the coupons were subjected to galvanic corrosion, there are no weight loss measurements for the coupons. Nevertheless, an examination of the samples in FIG. 12L shows that while there was significant structural degradation and significant spreading onto the carbon fiber with the uncoated bolts, the coated bolted exhibited only superficial discoloration with limited spread to the carbon fiber panel to which it was mounted.

Tension loss tests were also conducted to determine whether the coating resulted in unacceptably increased tension loss in coated bolts compared to uncoated (control) bolts, and to bolts coated with a nylon 11 powder coat. An M-10 uncoated (control) bolt, bolts coated with a thermoset coating of the present disclosure, and bolts coated with nylon 11 were placed in a 19 mm thick steel block. Zinc coated steel washers were positioned between the head of the bolts and 10 mm steel nuts were threaded onto the threads of the bolt to secure the bolts to the block. The bolts were tighten to a torque of 45-55 N-m. The assembly, which included all of the bolts was heated to a temperature of 125° C. (about 257° F.) for a period of 800 hours. A Dakota Ultrasonics MINI-MAX bolt Tension Monitor was mounted to each bolt to ultrasonically determine the loss of tension in the bolts. The thermoset coating was applied to the bolts to a thickness of about 0.0025 inches to 0.0035 inches.

The uncoated (control) bolts exhibited a tension loss of about 20%, the bolts coated with a thermoset coating of the present disclosure exhibited a tension loss of about 25% and the bolts coated with nylon 11 exhibited a tension loss of about 33% to 65%. A review of the test data shows that the tension loss of the bolts coated with a thermoset coating of the present disclosure exhibited an acceptably low tension loss compared to the control bolts, whereas the bolt coated with nylon 11 exhibited an unacceptably high tension loss.

A thermal cycling test for tension loss of uncoated (control) bolts and bolts coated with a thermoset coating of the present disclosure and bolts coated with a nylon 11 powder coat was also conducted in which the bolts were subjected to thermal cycling between −40° C. and 80° C. (about −40° F. and 176° F.). The bolts were subjected to thermal cycling between −40° C. and 80° C. for 13 cycles and held at temperature for a period of 3 hours. The control bolts exhibited tension loss of about 18.6%, the bolts with a nylon 11 powder coat exhibited a tension loss of about 33.3% to 42.5%, and the bolts coated with a thermoset coating exhibited a tension loss of between about 4.7% and 14.5%, showing no adverse effects of the thermoset coating on tension loss in thermal cycling.

Bolts coated with a thermoset coating of the present disclosure also exhibit a uniform and non-interfering coating. The coating thickness as applied was about 0.63 mm (about 0.0021 inches) to about 0.89 mm (about 0.0029 inches), and when applied to a bolt having a recessed drive head, such as a hex or TORX® drive, does not interfere with engagement of the drive tip with the drive recess. The coating was also applied sufficiently along the threads so that the coating was present at the thread engagement, and was found to not interfere with fastening the bolts to a female threaded member. Advantageously, it has also been found that the present thermoset coating does not interfere with magnetism, and as such, the use of magnetic drives and drive tips and magnetically securing the bolts is unaffected. A depiction of the uniformity and thickness of the coating on a bolt is illustrated in FIG. 3.

The bolts were also tested for coefficient of friction, which is the friction that is exhibited as the bolt is tightened onto an assembly. The coefficient of fiction is a dimensionless value, but corresponds to the force that must be applied to properly tighten or torque the bolt to a certain value. The coefficient of friction desired for driving the bolts is about 0.10 to 0.16. The coefficient of friction of the coated bolts was adjusted by use of a lubricant to be about within this range.

These process descriptions are merely exemplary. In certain embodiments, the process may include additional combinations or substitutions of some or all of the steps described above. Moreover, additional and alternative suitable variations, forms and components for the process will be recognized by those skilled in the art given the benefit of this disclosure. Finally, any components or features of the articles and/or assemblies discussed above may be produced by embodiments of the process, and any steps or actions described in relation to the articles and/or assemblies may be incorporated into embodiments of the process.

As used herein, "about," "approximately," "substantially," and "significantly" will be understood by persons of ordinary skill in the art and will vary to some extent on the context in which they are used. Also as used herein, the terms "include" and "including" should be interpreted to have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

It will further be appreciated by those skilled in the art that the relative directional terms such as sides, upper, lower, rearward, forward and the like are for explanatory purposes only and are not intended to limit the scope of the disclosure.

All patents referred to herein, are hereby incorporated herein by reference, whether or not specifically done so within the text of this disclosure. In the present disclosure, the words "a" or "an" are to be taken to include both the singular and the plural. Conversely, any reference to plural items shall, where appropriate, include the singular.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A method to prevent corrosion of a susceptible article and to retain tension in a two-article threaded system, in which first and second articles of the two-article system have surfaces facing one another and in which the two articles have different anodic indices, and in which the articles are threaded to one another, the being tensioned to a predetermined torque, the method comprising:
    applying a coating material to the surface of the first article;
    curing the coating material on the surface of the first article,
    wherein at least one of the two articles is capable of exhibiting substantially no corrosion following exposure to a corrosive environment under standard GMW17026 after a 15 year simulated test;
    threadedly engaging the first and second articles with one another to contact and secure the surface of the first article with the surface of the second article to form a threaded joint;
    tensioning one of the first and second articles onto the other to a predetermined torque;
    following threaded engagement, heating the first and second articles to a predetermined temperature for a predetermined period time; and
    measuring a tension loss in the threaded joint following heating, wherein the tension loss in the threaded joint is no more than about 25%.

2. The method of claim 1 wherein the predetermined torque is about 45-55 N-m.

3. The method of claim 2 wherein the predetermined temperature is about 257° F. and the predetermined period of about is about 800 hours.

4. The method of claim 2 wherein the first and second articles, following threaded engagement were subjected to thermal cycling between about −40° F. and 176° F. for about 13 cycles and held at temperature for a period of 3 hours and wherein the threaded joint exhibited a tension loss of no more than about 15%.

5. The method of claim 1 wherein the coating material is a thermoset material.

6. The method of claim 5 wherein the thermoset material is an epoxy material that cross links during coating to form a cross-linked epoxy coating.

7. The method of claim 6 wherein the epoxy material is a fusion bond epoxy material.

8. The method of claim 1 wherein the coating material comprises a first coating material and a second coating material and wherein the first coating material is fully cured to form a first cured layer and the second coating material is applied onto the first cured layer.

9. The method of claim 8 wherein the second coating material is a lubricant.

10. The method of claim 1 wherein the first and second articles are dissimilar metals.

11. A two-article system in which first and second articles of the two-article system are threadedly engaged with one another to form a threaded joint, the first and second articles having surfaces facing one another and in which the two articles have different anodic indices, the surface of the first article comprising a coating layer formed by curing a coating material on the surface of the first article, and the surface of the first article in contact and secured with the surface of the second article, wherein at least one of the two articles are capable of exhibiting substantially no corrosion following exposure to a corrosive environment under standard GMW17026 after a 15 year simulated test, the threaded joint tensioned to a predetermined torque,
    wherein following threaded engagement, the heating the first and second articles are heated to a predetermined temperature for a predetermined period time and wherein a tension loss in the threaded joint following heating is no more than about 25%.

12. The system of claim 11 wherein the predetermined torque is about 45-55 N-m.

13. The system of claim 12 wherein the predetermined temperature is about 257° F. and the predetermined period of about is about 800 hours.

14. The system of claim 12 wherein the first and second articles, following threaded engagement were subjected to thermal cycling between about −40° F. and 176° F. for about 13 cycles and held at temperature for a period of 3 hours and wherein the threaded joint exhibited a tension loss of no more than about 15%.

15. The system of claim 11 wherein the coating material is a thermoset material.

16. The system of claim 15 wherein the thermoset material is an epoxy material that cross links during coating to form a cross-linked epoxy coating.

17. The system of claim 16 wherein the epoxy material is a fusion bond epoxy material.

18. The system of claim 11 wherein the coating material comprises a first coating material and a second coating material and wherein the first coating material is fully cured to form a first cured layer and the second coating material is applied onto the first cured layer.

19. The system of claim 18 wherein the second coating material is a lubricant.

20. The system of claim 11 wherein the first and second articles are dissimilar metals.

* * * * *